US010198333B2

(12) United States Patent
Trobough et al.

(10) Patent No.: US 10,198,333 B2
(45) Date of Patent: Feb. 5, 2019

(54) TEST, VALIDATION, AND DEBUG ARCHITECTURE

(75) Inventors: Mark B. Trobough, Olympia, WA (US); Keshavan K. Tiruvallur, Tigard, OR (US); Chinna B. Prudvi, Portland, OR (US); Christian E. Iovin, Federal Way, WA (US); David W. Grawrock, Aloha, OR (US); Jay J. Nejedlo, Wilsonville, OR (US); Ashok N. Kabadi, Portland, OR (US); Travis K. Goff, Hillsboro, OR (US); Evan J. Halprin, Hillsboro, OR (US); Kapila B. Udawatta, San Diego, CA (US); Jiun Long Foo, Bayan Lepas (MY); Wee Hoo Cheah, Bayan Lepas (MY); Vui Yong Liew, Lorong Kenari (MY); Selvakumar Raja Gopal, Tapah (MY); Yuen Tat Lee, Bayan Lepas (MY); Samie B. Samaan, West Linn, OR (US); Kip C. Killpack, Beaverton, OR (US); Neil Dobler, Aloha, OR (US); Nagib Z. Hakim, Santa Clara, CA (US); Brian Meyer, Cornelius, OR (US); William H. Penner, Olympia, WA (US); John L. Baudrexl, Olympia, WA (US); Russell J. Wunderlich, Livermore, CO (US); James J. Grealish, Beaverton, OR (US); Kyle Markley, Hillsboro, OR (US); Timothy S. Storey, Hillsboro, OR (US); Loren J. McConnell, Forest Grove, OR (US); Lyle E. Cool, Beaverton, OR (US); Mukesh Kataria, Fremont, CA (US); Rahima K. Mohammed, San Jose, CA (US); Tieyu Zheng, Sammamish, WA (US); Yi Amy Xia, Campbell, CA (US); Ridvan A. Sahan, Sunnyvale, CA (US); Arun R. Ramadorai, Sammamish, WA (US); Priyadarsan Patra, Austin, TX (US); Edwin E. Parks, Hillsboro, OR (US); Abhijit Davare, Hillsboro, OR (US); Padmakumar Gopal, Austin, TX (US); Bruce Querbach, Beaverton, OR (US); Hermann W. Gartler, Portland, OR (US); Keith Drescher, Olympia, WA (US); Sanjay S. Salem, Portland, OR (US); David C. Florey, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 339 days.

(21) Appl. No.: 13/997,182

(22) PCT Filed: Dec. 23, 2010

(86) PCT No.: PCT/US2010/061995
§ 371 (c)(1),
(2), (4) Date: Jun. 12, 2014

(87) PCT Pub. No.: WO2012/087330
PCT Pub. Date: Jun. 28, 2012

(65) Prior Publication Data
US 2015/0127983 A1    May 7, 2015

(51) Int. Cl.
*G06F 11/273* (2006.01)
*G06F 11/267* (2006.01)

(52) U.S. Cl.
CPC ........ *G06F 11/2733* (2013.01); *G06F 11/267* (2013.01)

(58) Field of Classification Search
CPC .. G06F 11/2733; G06F 11/267; G06F 11/261; G06F 11/3684; G06F 11/22;
(Continued)

(56) References Cited

U.S. PATENT DOCUMENTS 6,145,099 A    11/2000 Shindou
6,581,191 B1    6/2003 Schubert et al.
(Continued)

FOREIGN PATENT DOCUMENTS

CN    1194411 A    9/1998
CN    1252140 A    5/2000
(Continued)

OTHER PUBLICATIONS

PCT International Preliminary Report on Patentability for PCT Application No. PCT/US2010/061995, 12 pgs. (dated Jun. 25, 2013).
(Continued)

*Primary Examiner* — Nadeem Iqbal
(74) *Attorney, Agent, or Firm* — Nicholson De Vos Webster & Elliott, LLP

(57) ABSTRACT

An apparatus and method is described herein for providing a test, validation, and debug architecture. At a target or base
(Continued)

level, hardware hooks (Design for Test or DFx) are designed into and integrated with silicon parts. A controller may provide abstracted access to such hooks, such as through an abstraction layer that abstracts low level details of the hardware DFx. In addition, the abstraction layer through an interface, such as APIs, provides services, routines, and data structures to higher-level software/presentation layers, which are able to collect test data for validation and debug of a unit/platform under test. Moreover, the architecture potentially provides tiered (multiple levels of) secure access to the test architecture. Additionally, physical access to the test architecture for a platform may be simplified through use of a unified, bi-directional test access port, while also potentially allowing remote access to perform remote test and debug of a part/platform under test. In essence, a complete test architecture stack is described herein for test, validation, and debug of electronic parts, devices, and platforms.

20 Claims, 28 Drawing Sheets

(58) Field of Classification Search
CPC ........ G01R 31/31908; G01R 31/31912; G01R 31/318364
See application file for complete search history.

(56) References Cited

U.S. PATENT DOCUMENTS

| | | | |
|---|---|---|---|
| 6,618,839 B1 | 9/2003 | Beardslee et al. | |
| 6,823,497 B2 | 11/2004 | Schubert et al. | |
| 6,904,577 B2 | 6/2005 | Schubert et al. | |
| 6,931,572 B1 | 8/2005 | Schubert et al. | |
| 7,065,481 B2 | 6/2006 | Schubert et al. | |
| 7,069,526 B2 | 6/2006 | Schubert et al. | |
| 7,072,818 B1 | 7/2006 | Beardslee et al. | |
| 7,107,173 B2* | 9/2006 | Fritzsche | G01R 31/31907 702/122 |
| 7,222,315 B2 | 5/2007 | Schubert et al. | |
| 7,240,303 B1 | 7/2007 | Schubert et al. | |
| 7,356,786 B2* | 4/2008 | Schubert | G01R 31/31705 716/106 |
| 7,496,467 B2* | 2/2009 | Fritzsche | G01R 31/31907 702/122 |
| 7,506,286 B2* | 3/2009 | Beardslee | G01R 31/31705 703/14 |
| 7,676,806 B2* | 3/2010 | Curtis | G06F 8/65 717/168 |
| 7,827,510 B1 | 11/2010 | Schubert et al. | |
| 7,836,416 B2 | 11/2010 | Schubert et al. | |
| 8,099,271 B2 | 1/2012 | Schubert et al. | |
| 2003/0097615 A1* | 5/2003 | Corti | G06F 11/3636 714/37 |
| 2003/0126358 A1 | 7/2003 | Litt et al. | |
| 2003/0229685 A1* | 12/2003 | Twidale | G06F 9/46 709/220 |
| 2005/0171722 A1* | 8/2005 | Fritzsche | G01R 31/31907 702/122 |
| 2006/0036919 A1 | 2/2006 | Creigh | |
| 2008/0209266 A1 | 8/2008 | Williams et al. | |
| 2009/0034206 A1 | 2/2009 | Lu et al. | |
| 2009/0132976 A1 | 5/2009 | Desineni et al. | |
| 2009/0249122 A1 | 10/2009 | Nadehara | |
| 2010/0299745 A1 | 11/2010 | Karppinen et al. | |

FOREIGN PATENT DOCUMENTS

| | | | |
|---|---|---|---|
| EP | 1369783 A2 | 12/2003 | |
| JP | 08-315598 | 11/1996 | |
| JP | H10-111815 A | 4/1998 | |
| JP | 2001-34505 A | 2/2001 | |
| JP | 2003-022425 | 1/2003 | |
| JP | 2005-077259 | 3/2005 | |
| JP | 2007-509441 | 4/2007 | |
| JP | 2008-243190 | 10/2008 | |
| WO | WO 2005/043301 A2 | 5/2005 | |

OTHER PUBLICATIONS

First Office Action for Japanese Patent Application No. 2012-549998 with English translation, 5 pgs., (dated Jul. 30, 2013).
Narahara Shinya, "Let's Go! Kernel Expedition," Nikkei Linux, Nikkei BP, vol. 8, No. 8, pp. 106-115 (Aug. 8, 2006).
Hattori Hiroyuki, "Communication Specifications for Increasing Transportability of Loaded Application Software and the Implementation Thereof," Design Wave Magazine, CQ Publishing Company, vol. 10, No. 9, pp. 124-133 (Sep. 1, 2005).
Notice of Preliminary Rejection for Korean Patent Application No. 2013-7016196 with English translation, 6 pgs. (dated Oct. 23, 2014).
"Mobile JAVA service, realizing a function surpassing i-Appli, J-Phone and KDDI aiming at rollback for docomo," Mobile Internet, (vol. 1, fourth issue), Rick telecom Co., Ltd., pp. 12-13 ("Mobile JAVA"), May 10, 2001; 7pgs.
First Office Action for Japanese Patent Application No. 2014-092409; 3pgs; dated Feb. 17, 2015; (English translation only).
PCT "Notification of Transmittal of the International Search Report and the Written Opinion of the International Searching Authority, or the Declaration", Application No. PCT/US2010/061995, dated Apr. 1, 2013, 17 pages.
Notice of Allowance from Korean Patent Application No. 2013-7016196, dated Nov. 25, 2015, 6 pages.
Office action with English translation from Japanese Patent Application No. 2014-092409, dated Dec. 22, 2015, 2 pages.
First Office Action and Search Report from foreign counterpart China Patent Application No. 201080035787.5, dated Mar. 31, 2016, 24 pages.
Second Office Action and Search Report from foreign counterpart China Patent Application No. 201080035787.5, dated Nov. 28, 2016, 29 pages. (Translation available only for office action).
Third Office Action from foreign counterpart China Patent Application No. 201080035787.5, dated May 31, 2017, 25 pages.
Examination Report from foreign counterpart Indian Patent Application No. 9948/DELNP/2011, dated May 11, 2018, 6 pages.
Fifth Office Action from foreign counterpart Chinese Patent Application No. CN201080035787.5, dated May 18, 2018, 8 pages.
Fourth Office Action from foreign counterpart Chinese Patent Application No. CN201080035787.5, dated Dec. 5, 2017, 7 pages.
Notification of Reasons for Refusal from foreign counterpart Japanese Patent Application No. 2016-226340, dated Aug. 22, 2017, 4 pages.

* cited by examiner

TEST, VALIDATION, AND DEBUG ARCHITECTURE

CROSS-REFERENCE TO RELATED APPLICATION

This patent application is a U.S. National Phase Application under 35 U.S.C. § 371 of International Application No. PCT/US2010/061995, filed Dec. 23, 2010, entitled TEST, VALIDATION, AND DEBUG ARCHITECTURE.

FIELD

This invention relates to the field of computer systems and, in particular, to providing test and debug infrastructure for computer systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. And as both processors and computer systems grow in complexity, so does the nature of test and debug of those systems grow in intricacy.

The high-speeds, massive amount of logic, and small nature or processors are leading toward an inability to debug, validate, and launch products in a timely or cost-effective manner. Currently, the world of test and debug has been bifurcated between manufacturers and customers/vendors, where manufactures tend to focus on the silicon devices they provide and vendors focus on other parts that integrate with the silicon devices. Often to protect their silicon from both malicious and accidental damage, manufacturers don't expose their hardware debug hooks at any level to vendors, because there is no secure method of providing such access. And as the complexity of testing more advanced computer systems becomes more involved, manufactures spend a massive amount of money and effort to aide in validation; even when discovered problems are not directly related to their devices. Moreover, each different device (processor, controller hub, graphics device, motherboard, etc.) in a system may have its own access for test and debug. This disjoint approach at testing/debug has only led to more confusion and delay in validating products. In addition, traditional probing test methods have become prohibitive due to the physical size limitations of new integrated circuits.

Furthermore, regardless of being a manufacturer or vendor, the tools to attempt validation, such as external logic analyzers and oscilloscopes, cost a considerable amount of money, as well as take a significant amount of time by trained employees to connect and be utilized correctly for validation. Additionally, these external validation tools are only able to capture protocol exchanges on interconnects and have difficulty fully ascertaining the states and interactions of devices.

As specific examples, current computer systems don't provide ways to validate different system events under certain conditions without great expense and time, such as tracking device internal signals, traces, or states; tracking signals early in a boot process; determining certain events, such as hang events, that have been integrated as in-band messages, and capturing new, high-speed internal, memory, and Input/Output (I/O) traffic and/or protocols. Essentially, there is currently no unified, effective way to validate across multiple vectors (processor test/validate, platform debug, electrical margining, motherboard diagnostics, etc.).

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth, such as examples of specific types of specific processor configurations, controllers, validation/test/debug hooks, locations of components, security protocols, abstraction methods, information formatting and placement, physical access port configurations and locations, power configurations, etc. in order to provide a thorough understanding of the present invention. It will be apparent, however, to one skilled in the art that these specific details need not be employed to practice the present invention. In other instances, well known components or methods, such as specific and alternative processor architecture, specific logic circuits/code for described functions and algorithms, specific validation control implementation details, other known design validation hooks, known security and access methods, and other specific operational details haven't been described in detail in order to avoid unnecessarily obscuring the present invention.

The method and apparatus described herein are for providing a test infrastructure for computer systems. Specifically, a primary focus of the discussion is directed toward validation within traditional computer systems including processors, such as processor 100. Yet, the apparatus' and methods described herein are not so limited, as they may be implemented in conjunction with alternative computer architecture, as well as any electronic device that is to be tested, debugged, validated, etc. For example, the test infrastructure described herein may be implemented in a communication device or other integrated circuit environment. Or the test infrastructure may be utilized in embedded, small form-factor devices, such as PDAs and cell phones.

Embodiments of Processor Architectures

Figure 1:
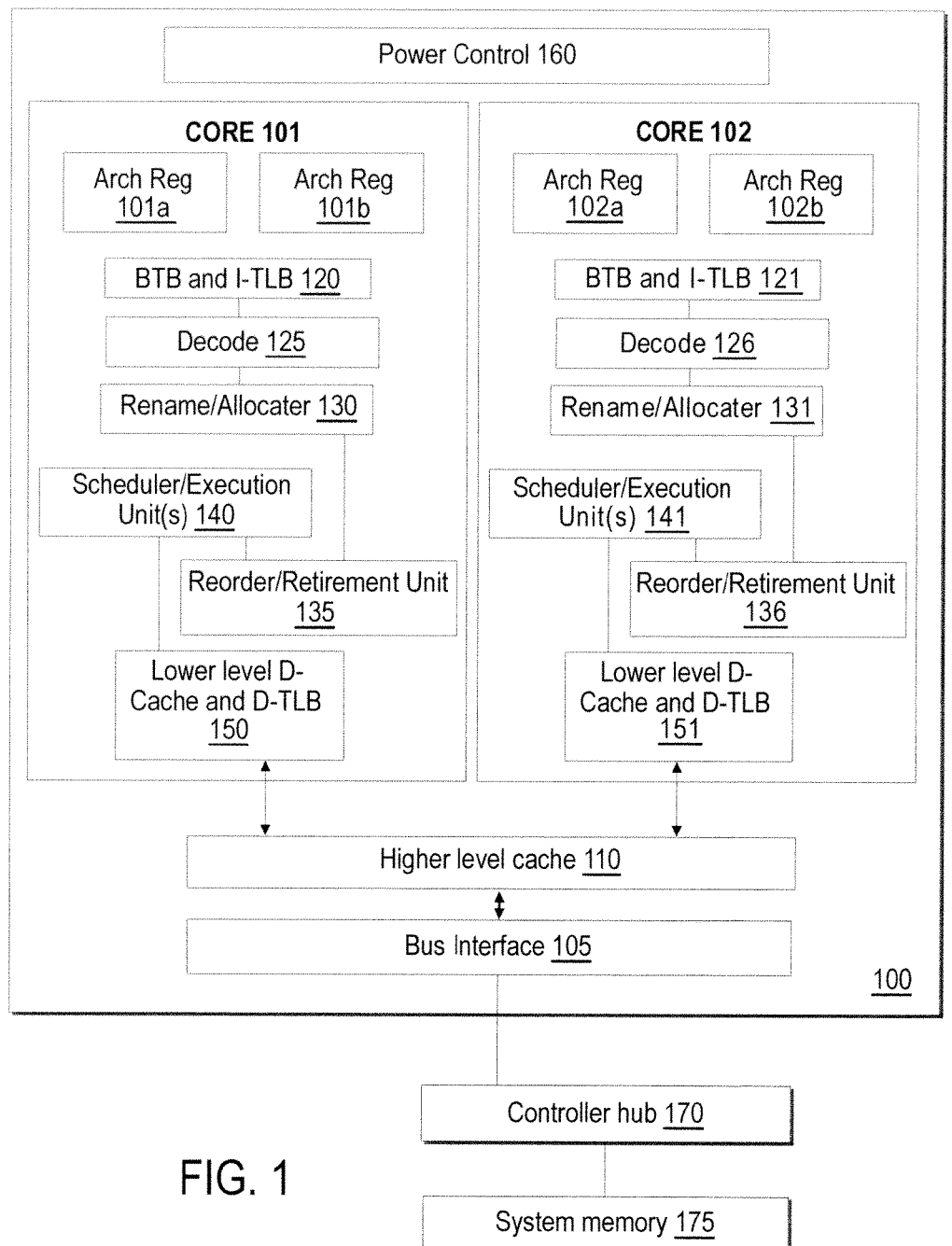
FIG. 1 illustrates an embodiment of a logical representation of a multiprocessing element processor.

Referring to FIG. 1, an embodiment of a processor including multiple cores is illustrated. Processor 100 includes any processor, such as a microprocessor, an embedded processor, a digital signal processor (DSP), a network processor, or other device to execute code. Processor 100, in one embodiment, includes at least two cores—core 101 and 102, which may include asymmetric cores or symmetric cores (illustrated embodiment). However, processor 100 may include any number of processing elements that may be symmetric or asymmetric.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/ resources of a processor is illustrated. Note that a processor may include, or omit, any of these functional units, as well as include any other known functional units, logic, or firmware not depicted. As illustrated, core 101 includes a simplified, representative out-of-order (OOO) processor core. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Here, often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific, new instructions, such as a conditional commit instruction and/or a speculative checkpoint instruction. As a result or the recognition by decoders 125, the architecture or core 101 takes specific, predefined actions to perform tasks associated with the appropriate instruction.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

It should be noted that FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. In addition, FIG. 1 only depicts two cores; yet, a processor may include any number of cores, such as multiple cores of the same type, as well as more than two cores that each differ in type.

FIG. 1 also illustrates an embodiment of processor that is coupled in a point-to-point fashion with an interface to an external memory controller (controller hub 170). However, many current processors have begun including an on-processor memory interface module—an on-chip module—with different interconnection architectures, such as a ring configuration to interconnect multiple cores, as well as shared caches and other interfaces.

Figure 2:
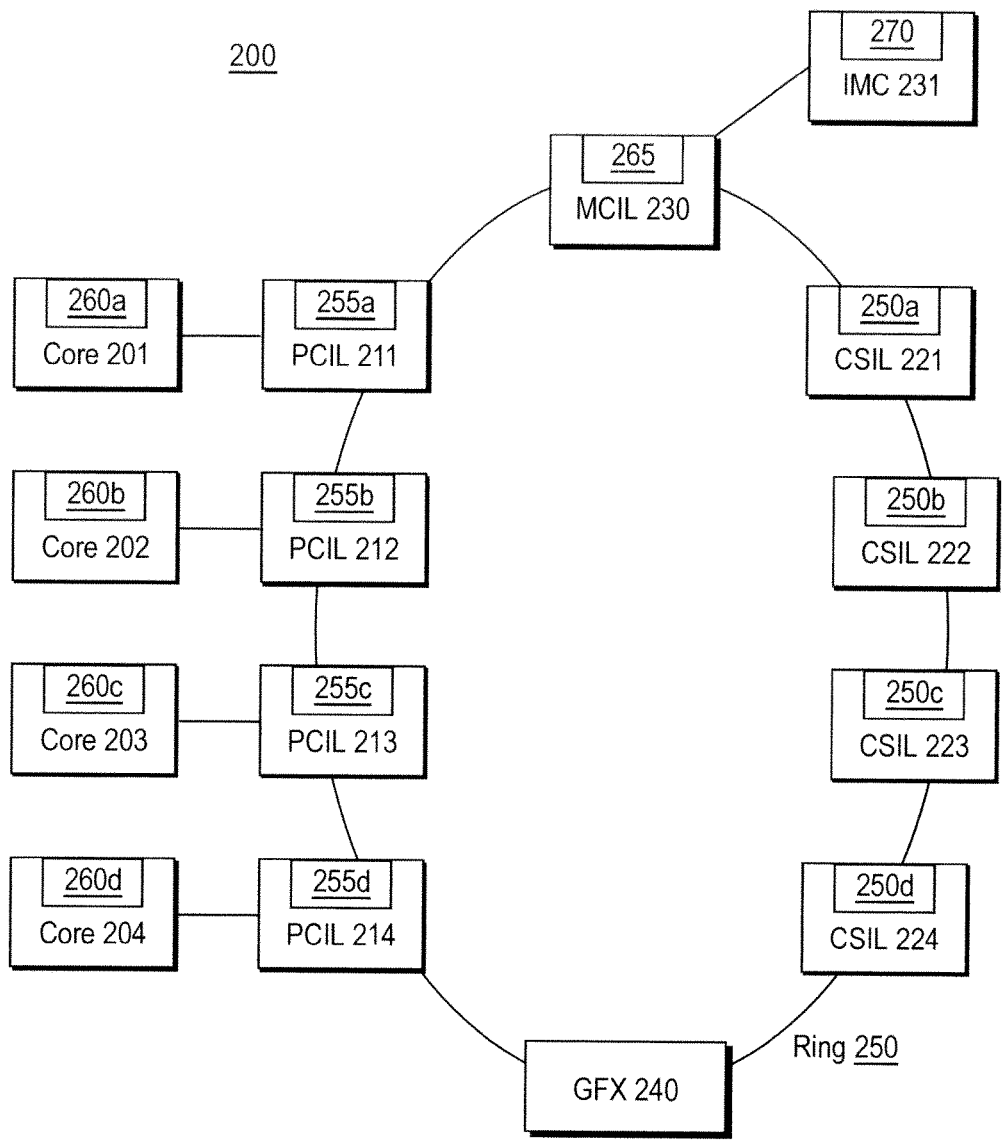
FIG. 2 illustrates another embodiment of a logical representation of a multiprocessing element processor.

One embodiment of such an interconnection architecture is illustrated in FIG. 2. Processor 200 is illustrated as including a distributed cache; a ring interconnect; as well as core, cache, and memory controller components. However, this depiction is purely illustrative, as a processor implementing the described methods and apparatus may include any processing elements; style or level of cache; and/or memory, front-side-bus or other interface to communicate with external devices.

In one embodiment, caching agents 221-224 are each to manage an associated distributed cache. Note that caching agents 221-224 may manage slices of a logically shared cache or individual private caches at the same memory level. As an example, each cache component, such as component 221, is to manage a slice of a cache for a collocated core—a core the cache agent is associated with for purpose of managing the distributed slice. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. Additionally, ring 250 is shown as including Memory Peripheral Hub (IMPH) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

Embodiments of a Test Infrastructure

In one embodiment, a computer system that includes a processor, such as those depicted in FIGS. 1 and 2 or other known processing device, include a test infrastructure adapted to support efficient (both in cost and complexity) test, validation, and debug of different aspects in the computer system. To provide such an efficient environment, there is often a number of layers (e.g. physical, communication, and software layers) to implement, such as the layers depicted in FIG. 3.

For example, a physical layer 305 includes testing hooks (hardware or firmware provided in a system to provide testing, validation and/or debug functionality), which may be included throughout the devices (processor, interconnects, controller hubs, etc.) of a computer system. In one embodiment, these testing hooks collect debug/validation information either by design; at the direction of other hardware/firmware, such as a microcontroller; or at a direction of software, such as user/vendor debug programs or code integrated within the computer platform. Specific illustrative examples of some hooks include: architectural and microarchitectural testing/trace measurement features in a device, electrical validation tools, in-computer system/on-device logic analyzers, interconnect protocol/trace measurement features, platform level testing features, power testing features (discussed in more detail below in the Embodiments for Power Validation section below), power-up/boot trace measurement features; validation circuits, high-volume manufacturing testing features, and other known hardware-based measurement and testing features.

In addition to providing the designed for test hooks; in one embodiment, a communication layer 310 is adapted to provide communication between the test hooks and test/debug software. Communication layer 310 may be as simple as providing software the ability to directly access the testing hooks (either for defining testing scenarios or retrieving testing results). However, as aforementioned, a device designer may want to obfuscate silicon testing features from vendor or user access. So in that scenario, communication layer 310 provides software an abstracted view of hardware testing features, such that a vendor or user's software interacts with communication layer 310. And communication layer 310 interacts with hardware within physical layer 305 in a manner that is abstracted from the view of a customer. In one embodiment, a microcontroller, which may be referred to as a Validation Control Unit (VCU), is to control access to the various test hooks. Here, vendor software is able to request the VCU to coordinate different validation tasks, such as program various breakpoints, microbreakpoint trigger events, extract stored traces, deliver validation information, and provide different levels of access.

As implied by the last illustrative example, different levels of abstraction and security may be provided with regard to the test infrastructure. Here, a silicon designer may want to, allow themselves unbridled access to all of the included test features, while providing a sliding scale of access to different vendors, customers, and users. Consequently, a first step includes providing an abstraction layer that is capable of abstracting the hooks in physical layer 305. And the second step includes providing a secure access methodology that, in one embodiment, is able to delineate between the different levels of access.

In addition, communication layer 310 is also to provide reporting of validation information up to software layer 315. For example, an on-die logic analyzer collects trace information from a processor. And communication layer 310 includes logic adapted to provide that trace information to a storage structure, such as a cache or system memory, in a defined format, such that software layer 315 is able to access, recognize, and manipulate the data. As a corollary, software layer 315, which may also be referred to as an access layer, provides programs/tools that access communication layer 310 and process test data content. Continuing the example from above, when trace information is placed in a storage structure, validation and debug programs may process the trace information for interpretation (validation and debug).

So far the primary discussion of access has been in regards to logical or abstracted access to data from physical layer 305. However, how the access to physical layer 305 is yet to be discussed. In one example, such access is through physical access. Here, a dedicated or universal debug/validation port is provided to support bi-directional communication (upwards communication of extracted debug information and downwards communication of debug requests, etc., such as with a VCU for abstracted access to physical hooks). This port may be located or replicated anywhere within a computer system (processor package, chipset, motherboard, or through an existing I/O interface, such as a Universal Serial Bus interface).

In another embodiment, the test infrastructure is also to provide remote access. For example, assume a vendor is attempting to validate a processor in a computer system, but they are having problems due to the complexity of current computer platforms. And the vendor is only provided a high-level of abstracted access to processor debug tools. Instead of the processor manufacturer having to physically send a validation engineer to aid in the debugging process, the infrastructure potentially allows remote access for validation and debug. Moreover, the remote manufacturer, due to the security protocols, may be able to access more of a hardware infrastructure to solve the debug problem, while still maintaining the concealment of the silicon test features from the vendor. In addition to the remote debugging, the layers of FIG. 3 may also be locally or remotely updated, such as providing patches to update code within firmware or the VCU to provide flexible and adaptable future validation.

Figure 3:
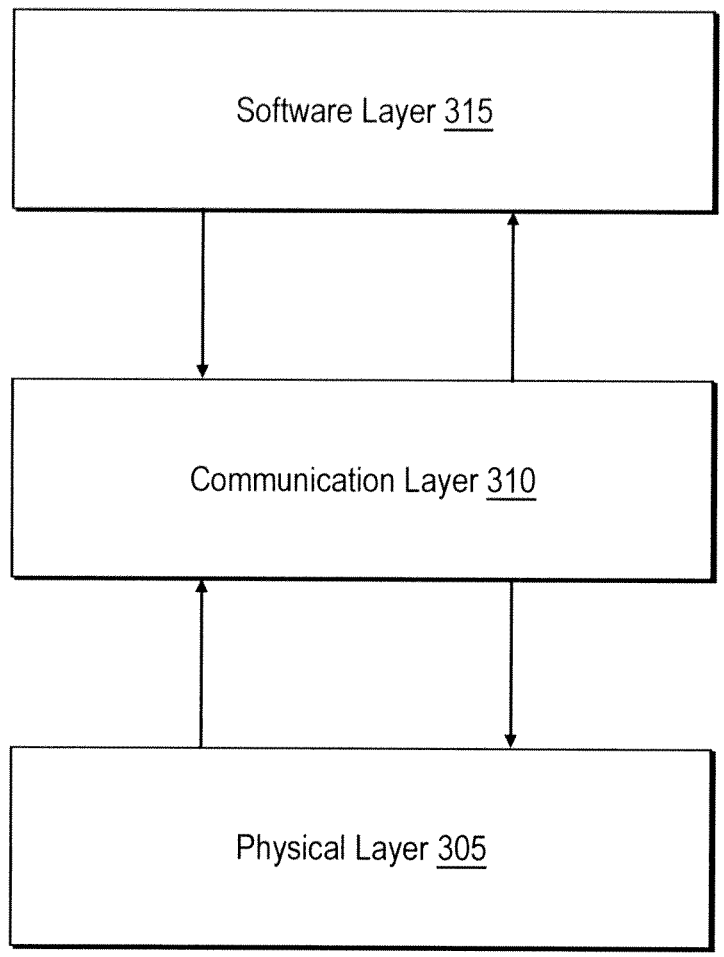
FIG. 3 illustrates an embodiment of a logical representation of a layered test architecture.

Note that FIG. 3 has generalized layers of a test architecture into three main categories (physical, communication, and software). However, the test architecture stack may be organized in any manner, as well as include other layers that provide the same test interface. For example, in one embodiment, the validation architecture stack includes a target layer (physical unit under Dfx test), a transport layer (layer to adapt the higher-level transport-agnostic stack to run on the target DFx unit to test); an abstraction layer (layer to provide abstracted communication between applications and lower-level DFx interfaces); an application layer (layer including applications, services, tools, and other software to communicate with the abstraction layer for interface with DFx services); and a presentation layer (layer to correlate, visualize, and/or present underlying data, protocols, and information).

Embodiments of Validation, Test, and Debug Hooks

In one embodiment, validation, test, and debug hooks are integrated in silicon of a processor and/or computer system/platform to support efficient test, validation, and/or debug. Often validation hooks integrated in final products are referred to as Design for Debug, Validation, and/or Test (herein referred to as DFx). DFx includes any known hook included in a product to support test, debug, and/or validation of that product (self-validation tools). Below, numerous illustrative examples of such hooks are included; however, it's important to note that the list is non-exhaustive. Moreover, any or all of the DFx features discussed below may be omitted or combined with other known integrated testing/debug features. In addition, the primary discussion of DFx is in regard to processors; yet, similar hooks may be included in other silicon devices, such as motherboards, controller hubs, embedded processors, graphics processors, input/output (I/O devices), etc.

Figure 4:
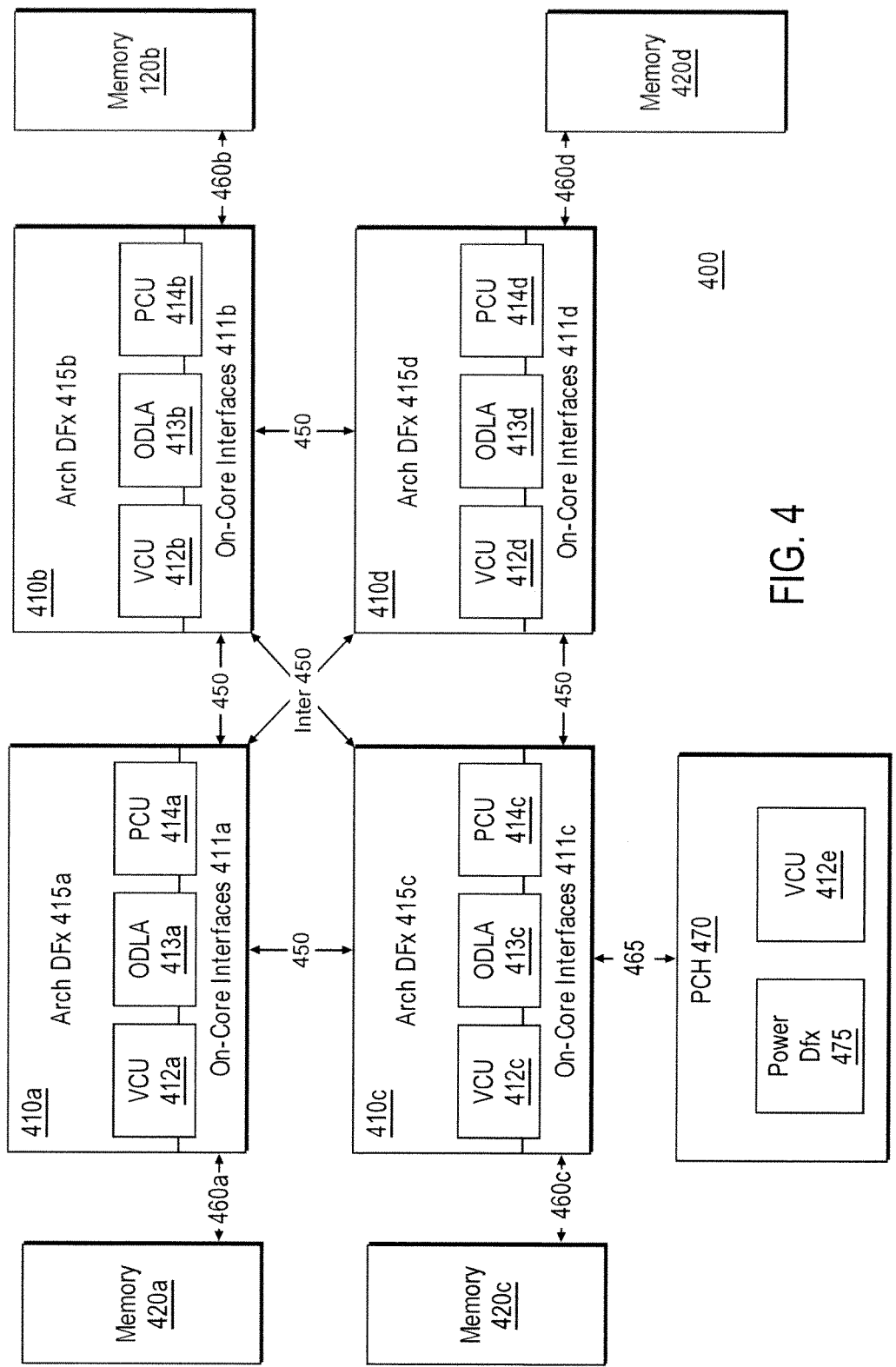
FIG. 4 illustrates an embodiment of a computer system including multiple processors having exemplary embodiments of DFx features.

Turning to FIG. 4 an embodiment of a computer system including multiple processors to discuss the exemplary embodiments of DFx features is depicted. Note that depicted is purely illustrative to move the description forward. And any known computer system configuration, such as a more traditional, legacy configuration as depicted in FIG. 1, may be utilized. Furthermore, each of the four processors (410a, b, c, and d) are illustrated as having the same components. And although each processor may include different, asymmetric configurations, to simplify the description, the features of processor 410a are primarily discussed.

In one embodiment, computer system 400 includes one or more Validation Control Unit(s) (VCU) to provide and control access to silicon DFx. As illustrated, each component (processors 410a-d and peripheral controller hub 470) include their own VCU); yet, any number or layouts of VCUs may be provided to control access to a processor or a computer system. Embodiments of a VCU and features related thereto are discussed in more detail below in the Embodiments of a Validation Controller section below. Therefore, for the purpose of describing embodiments of DFx features, VCU 412a, in this scenario, provides access to DFx features of processor 410a.

As a first example of a DFx feature, processor 410a includes an integrated (also referred to as on-die or on-chip) logic analyzer (ODLA or OCLA) 413a. Previously, logic analyzers included separate, physical devices that coupled to parts through external ports or by a large number of probes to capture/display digital signals of the device. But the external devices are extremely expensive. And as computers advance in complexity, the lag/delay between making a product to development of a logic analyzer capable of interfacing the with product has drastically increased. Consequently, the technology industry is losing the ability to debug, validate and launch products in a timely, cost-effective manner.

Therefore, in one embodiment, processor 410a includes ODLA 413a (comprised of hardware, firmware, micro-code, or a combination thereof) adapted to support on-die functionality of a logic analyzer. In other words, processor 410a includes ODLA 413a to capture digital signals, states, traces, etc. As a specific illustrative example, processor 410a includes logic adapted to set breakpoints (or microbreakpoints) to trigger a capture point. Here, event storage, such as control registers, are set with one or a combination of events that define a trigger scenario. And when that scenario is encountered (each of the events occur in the manner specified in the scenario), the states, signals, traces, etc. of interest in the processor are captured. A trigger condition or scenario may be as simple as assertion or desertion of a test signal or as complex as a combination of microarchitectural events, such as a reaching a number of instruction retirement pushouts over a threshold associated only with instructions that experienced level-two cache misses.

Note that ODLA 413a may not be physically grouped together as shown in the logical block within FIG. 4. But instead, ODLA 413a may include logic distributed through processor 410a to capture any internal or outgoing signal(s) within processor 410a. In one scenario, ODLA 413a includes: logic associated with architectural or microarchitectural portions of processor 410a to capture traces or circuit logic levels; logic associated with internal interconnects to capture internal traffic; logic associated with memory interfaces, such as interface 460a, to capture memory traffic; logic associated with input/output interfaces, such as interfaces 450, 465, a graphics interface (not illustrated), a legacy or sideband interface (not illustrated), or other known interface associated with a processor.

With previous external logic analyzers, the results were captured by the external device. Yet, in the above scenario, processor 410a operates as its own logic analyzer. Therefore, in one embodiment, ODLA 413a is to utilize available computer storage to hold the capture information. For example, ODLA 413a uses a cache memory or a portion of memory 420a as a trace buffer to hold the captured information. In one embodiment, a portion of memory 420a is sequestered from view of software. And the captured information is placed into the sequestered portion of memory.

Here, the captured information may be placed in its raw form with a predefined, specified format, such that validation software (either from a manufacturer or customer at an application layer) with the appropriate access level is able to access and manipulate the data, such as transforming the raw data into timing diagrams, protocol decodes, representation of traces, or other known manipulation of logic analyzer data. In another embodiment, ODLA 413a (either with included programmable logic, code, or micro-code) formats the raw data into another form and places them in memory for interpretation by higher-level software.

As a specific illustrative embodiment, software requests a certain breakpoint scenario for processor 410a through an Application Programming Interface (API) provided by a communication layer, such as through an abstraction layer, provided by VCU 412a. VCU 412a receives the request, and if the request has the requisite security level access, VCU 412a sets up the trigger scenario in control registers of processor 410a. Then, either during normal or a test mode of execution, when the breakpoint scenario defined in the control registers is encountered, the breakpoint is triggered. And the captured information is stored into memory 420a in a region obfuscated from view of an Operating System. Through an interface API, software is able to access, manipulate and interpret the information; essentially replacing the need of using an external logic analyzer or oscilloscope, while potentially provides a more complete and detailed look at the internal and external communication of silicon devices.

In addition to setting trigger scenarios, any other known validation technique may also be integrated and/or combined with ODLA 413a. For example, ODLA 413a in combination with other logic is able to set test cases and capture similar trace information. In fact, it is quite common that designers design for worst-case scenarios that are not easily replicated during normal execution. As a result, during validation it may be advantageous to be able to excite processor 410a with specific worst-case stimuli to determine both the actual response and the correlation between the actual response and a previous, simulations. So here, logic is adapted to set specific logic states or provide certain inputs to generate scenarios that ODLA 413a captures data from.

So far the discussion of DFx has primarily focused on ODLA 410*a* to capture internal state of processor 410*a*. Yet, as alluded to above ODLA 413*a* and/or other logic, in one embodiment, is adapted to also validate external interfaces and interconnects. Here, instead of placing pico-probes on the electrical traces to observe communication between devices as with external logic analyzers, ODLA 413*a* included in the silicon is able to perform the same function at the actual interface within device.

Note that similar interconnect hooks may be included on on-processor interfaces. As an example, returning momentarily to FIG. 2, DFx hooks may be interspersed around ring 250 to validate: the electrical attributes (timing margins, bitrates, error tests, cross-coupling, ringing, undershoot, overshoot, etc) of ring 250, the traffic on ring 250, the communication protocol (i.e. cache coherency protocol) of ring 250, the traffic/protocols on controller interface 230/231, the traffic on graphics interface 240, etc.

As a result, validation of a complex interface may include hooks integrated in silicon to validate multiple layers of an interconnect architecture stack, such as the physical, electrical attributes, states/traces of logic, and higher-level protocols. From FIG. 4, a few examples of such interfaces (QPI interface 450 to connect processors 410*a-d*; memory interfaces 460*a-d* to connect processors 410*a-d* to memory devices 420*a-d*, respectively; and a PCI-E or other interface to connect legacy processor 410*c* to peripheral controller hub 470) to include DFx hooks for validation are illustrated. Additionally, other interfaces, such as a graphics interface or sideband interconnect may also utilize similar DFx hooks, as described herein. Yet, it is important to note that the illustrated interfaces are processor centric. And other devices, such as PCH 470, may also include similar DFx hooks to validate other interfaces, such a peripheral interfaces (PCI-E, Universal Serial Bus (USB), Serial Advanced Technology Attachment (SATA), a Direct Media Interface (DMI) and other known computer interconnects).

Figure 5:
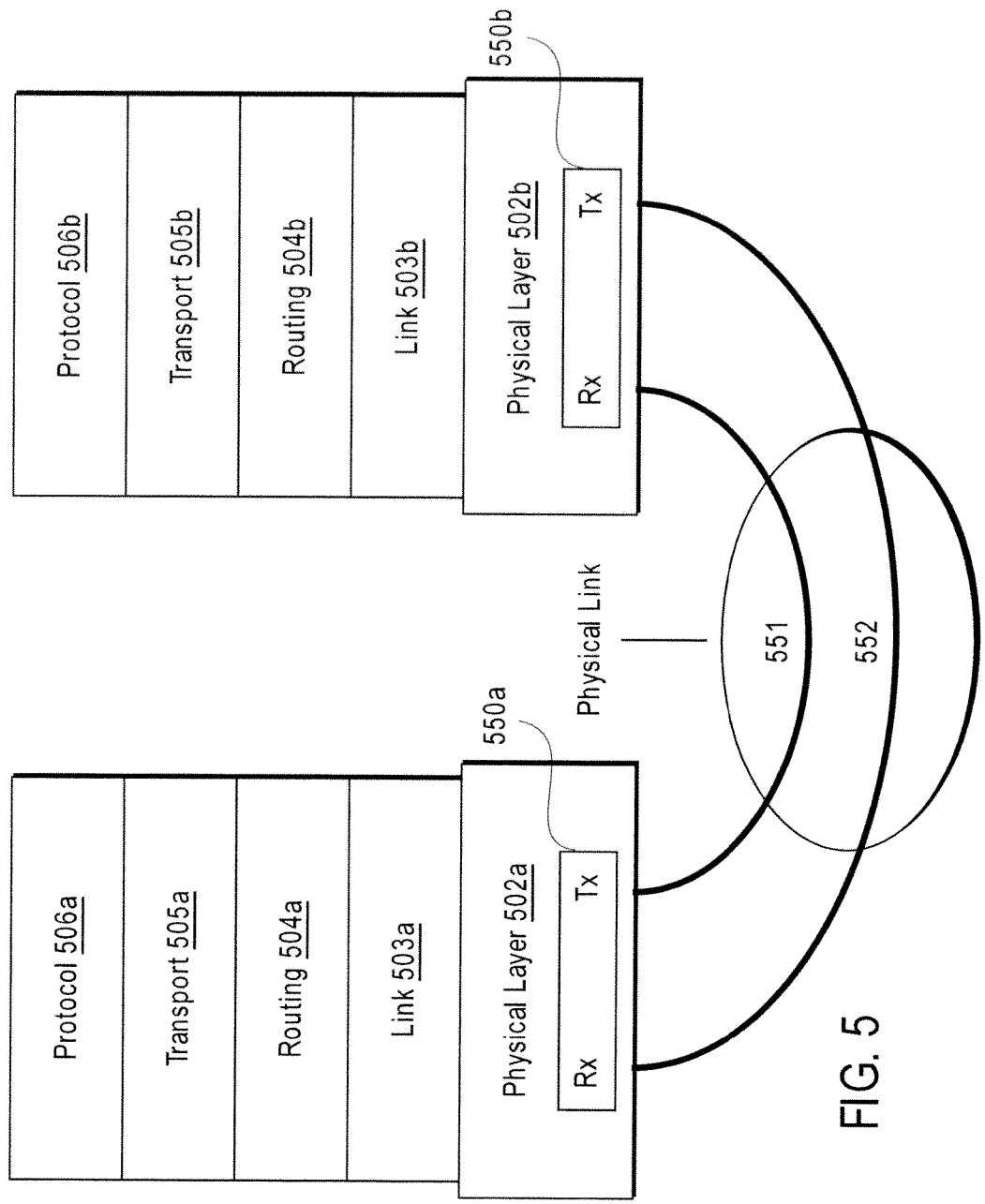
FIG. 5 illustrates an embodiment of a block diagram for a bidirectional interconnect architecture utilizing a layered interconnect stack.

To provide a specific illustration example, FIG. 5 depicts an exemplary embodiment of a block diagram for a bidirectional interconnect architecture utilizing a layered interconnect stack; illustrative examples of which include a PCI Express (PCI-E) and Quick Path Interconnect (QPI). The layered architecture depicted is primarily discussed in reference to a QPI architecture, but may similarly be applied to any interconnect, such as a PCI, PCI-E, graphics, memory, peripheral, or other known interconnect. Reference to layers of FIG. 5, such as a physical layer 502, includes discussion of a generic layer, which may be implemented in different agents, such as physical layer 502*a* and physical layer 502*b*. As depicted, the interconnect stack is partitioned into five layers, one or more of which are potentially optional based on a design implementation. For example, routing layer 504, in one embodiment, is embedded in the functionality of link layer 503; hence, routing layer, in one embodiment, is not a separate and distinct layer.

In one embodiment, physical layer 502 is responsible for electrical transfer of information on a physical medium. For example, a physical point-to-point link is utilized between link layer entities 503*a* and 503*b*. As an illustrative example, the physical link includes a differential signaling scheme, which includes a bidirectional differential signaling pair 551 and 552. Here, the physical layer is potentially logically divided into an electrical sub-block and a logical sub block, such that the physical layer is to isolate the rest of the stack from the electrical transfer of information and is to communicate with link layer 503.

In one embodiment, link layer 503 abstracts physical layer 502 from upper layers of the stack and provides link related services, such as reliable data transfer and flow control between connected agents/entities and virtualization of a physical channel/interface into multiple virtual channels and message classes. Here, virtual channels may be viewed as multiple virtual networks for use by upper layers of the stack. For example, protocol layer 506 potentially relies on the abstraction provided by link layer 503 to map a protocol message into a message class and, therefore, to one or more virtual channels.

Routing layer 504, in one embodiment, provides a flexible method for routing packets from a source to a destination. As stated above, in extremely simple topologies, routing layer 504 may not be explicit, but rather integrated into the functionality of link layer 503. For example, routing layer 504 may rely on the abstraction of link layer 503 to specify a <port, virtual network> pair to route a packet. Here, routing table information is held to provide routing information for packets.

In one embodiment, transport layer 505 provides end-to-end reliable transmission services. Similar to routing layer 504, transport layer 505 is also optional based on design implementation. As an example, transport layer 505 relies on routing layer 504 services to provide reliable transmission support for protocol layer 506. Within an interconnect architecture, in one embodiment, a subset of components include transport layer 505. As a result, this subset of components define sub-fields of packets relating to transport layer 505, while other components potentially do not define those sub-fields.

Protocol layer 506, in one embodiment, is to implement a higher-level communication protocol between nodes/agents, such as cache coherence, ordering, peer-to-peer communication, interrupt deliver, etc. In other words, protocol layer 506 defines permissible messages, requests, responses, phases, coherence states, etc. for nodes or agents, such as home nodes, peer nodes, caching nodes, and non-caching nodes, accordingly. Examples of messages, such as home node messages, snoop messages, response messages, etc. are discussed below.

Note that discussion of layers, and logic associated therewith, may be coupled in any manner. For example, it may be said that protocol logic is coupled to physical layer, i.e. transmission or receiving logic. Here, as can be seen from FIG. 5, in one embodiment, protocol logic may not be directly coupled to physical layer logic, but rather coupled through other layer logic. Furthermore, the interconnect stack, in one embodiment, is coupled to inner component logic, such as cache control or cache memory logic, to initiate appropriate cache coherence actions.

In one embodiment, a QPI based interconnect includes a Modified Exclusive Shared Invalid Forward (MESIF) protocol, which provides a protocol similar to a snoop protocol without the potential limitations of a single, serializing bus. Like a snooping cache protocol, MESIF relies on nodes with cached copies of data to maintain coherence. The use of point-to-point links rather than a synchronous, centralized broadcast introduces the problem of time-warp, i.e. the fact that events appear to occur in a different order from the viewpoint of different nodes. As an example, the MESIF protocol handles time-warp through recognition of potential errors due to time-warp, and providing protocol or software solution thereto.

A home node is often associated with an uncached copy of data. As a result, a home node may participate in a transaction relating to data associated with the home node.

However, the home node does not have to be included in a "critical path" associated with a transaction, but rather a home node may interject in the transaction to resolve conflicts and time-warp issues. Because of the concurrent-broadcast nature of the scheme, in one embodiment, MESIF achieves the low latency associated with snooping protocols, while acquiring a cacheable copy of the data, in certain cases, in the minimum possible latency: a single roundtrip request-response.

In one embodiment, a basic transaction related to a MESIF protocol involves broadcasting an initial request to all peer nodes as well as a home node. If a copy is cached in state E, F, or M coherency state, it is included in the response. A second message is then sent to the home node, informing it that the request has been satisfied. If the requested line is uncached, or if only S-state copies exist, the second request sent to the home node is used to confirm the previous request, which the home node may have, by now, fetched from its memory. In either case, the home node responds to the second request (and potentially to the first, though they can sometimes be combined) for purposes of synchronization and conflict resolution. Note that the home node may have one or more caches, so it may respond to the initial request just like any other node.

In one embodiment, conflicts are handled in a distributed way. The time-warp problem makes it difficult to detect conflicts, because individual requests can be delayed for an arbitrarily long time. A conflict will be detected, however, if each node monitors for conflicts after making a request. Multiple nodes may potentially detect a conflict, but as an example, at least one of the nodes will detect a conflict. As a result, a response from a node, in one embodiment, potentially includes conflict information.

In one embodiment, a node receiving a copy of the data from a response is allowed to use the data internally immediately upon receipt, but does not make the effects of using the data visible to the rest of the system, i.e. globally visible, until the node has received a confirmation. The confirmation may also include instructions that the requesting node must forward its copy to another node, and perhaps evict the node from its own cache. Finally, when a node responds to a request from another node by supplying the cached data, the node, in one embodiment, defers other requests it receives for the same cache line until the node receives a response from the Home node acknowledging the fact that the node forwarded the data, thus assuring that all nodes observe the same order of transfer of the (possibly writable) cache line.

The home node, as stated above, is a repository for uncached data, but the home node also may include processor and a cache. Here, when the home node processor misses the cache, the home node broadcasts requests to all other (peer) nodes, and the home node handles the request internally as it would any other request arriving for the home node. Note that this is a special case, in that the home node does not explicitly send messages to itself (the Home node). In addition, when an external request arrives for data that is cached locally, the home node responds appropriately.

The disclosed message protocol defines a set of allowed messages between coherence (cache and home) agents, non caching agents, as well as other agents (memory controllers, processors, etc). A coherence protocol uses the messages as words and grammar in an algorithm to express a coherent thought. This algorithm sensibly orders requests, resolves conflicts, and describes interactions between caching agents. Although, a MESIF protocol is described above, the MESIF cache coherence protocol is not required to be utilized. For example, the Forward state may not be utilized, which results in utilization of the known MESI protocol. Furthermore, note the discussion above includes an exemplary overview of an embodiment for a MESIF protocol. Consequently, various components described above may differ in separate embodiments.

As can be seen the validation and debug of such a complex (both from an electrical and protocol standpoint) becomes extremely cumbersome. Therefore, in one embodiment, processor 410a from FIG. 4, includes DFx to aid in validation throughout a layered interconnect stack. For example, ODLA 413a in response to a trigger scenario or some other event, is capable of capturing traffic, traces or states of the interconnect layered architecture. In one embodiment, a state refers to a snapshot of states of parameters, devices, agents, and/or other components of a validation object. A state may also be referred to as an architectural state of an architecture or validation object. As another example, a state is defined by the combination of the values of parameters at the snapshot of the state. Consequently, if one hundred parameters are identified for an interconnect architecture, then every combination of different values for those one hundred parameters potentially result in different states As a state often refers to a large number of parameters for a complex protocol, an oversimplified illustrative example of a state for a cache coherence protocol includes one processor holding a cache line in a shared coherence state, two processors holding the cache line in an invalid state, and a snoop is received at one of the processors. Here, there are multiple protocol agents, multiple cache lines held in multiple states, and a request/message received at a specific destination. Therefore, in this simple example alone, there are quite a few parameters. As another illustrative example, a write transaction carrying a data payload potentially results in multiple states, as other parameters, such as the destination of the write, state of cache lines associated with the data payload to be written, interconnect traffic, write responses by other agents, etc. may be varied Therefore, a parameter, in one embodiment, refers to any element within a protocol, physical logic, device, agent, or global state/variable that may be varied or placed in different states. As a specific example, when validating cache coherent interconnect protocol, a parameter for a caching agent, such as processor 410a, includes a cache response to a snoop. Here, one value of a cache response parameter includes forwarding the snooped cache line to the requesting device and a second value of the cache response parameter includes writing the cache line to a home node. Other common coherency protocol parameters include different types of agents, agent responses, device responses, interconnect responses, message responses, types of responses, other responses to specific actions, response destinations, messages, types of messages, message destinations, requests, types of requests, request destinations, types of caches, cache states, cache locations, register states, etc.

However, as any architecture, such as physical interconnect, communication protocol, or other protocol may be an object of validation, a parameter may encompass a wide variety of variables. A non-exhaustive illustrative list of potential protocol related parameters include a number of protocol agents, a type of protocol agent, a type of cache implementation for an agent, numbers of protocol agents of varying types, a style of protocol agent, a state of an protocol agent, a state of circuitry or state machine in an protocol agent or on the bus, an agent identifier, a number of protocol requests, a request type, a request source, a request destination, a state of a request, an operation referenced, a source of an operation, an address referenced, an address accessed, a state of an address location, a data payload, a state of an protocol agent, a state of a cache, a state of a cache line, and a physical protocol state parameter, such as a voltage, frequency, power state, or other physical protocol attribute.

In regards to physical layers 502*a,b*, a few examples of physical parameters of an interconnect include voltage, undershoot, overshoot, frequency, period, spread-spectrum, jitter, timing margin, noise, etc, while other parameters include the state of interconnect related state machines, types of agents, states of agents, states of I/O circuitry in agents, etc. However, any variable element within an architecture may be considered a parameter.

Therefore, in one embodiment, ODLA 413*a* is adapted to capture states or traces, which may encompass all or portions of the target interface. In addition to a specific snapshot at one time in response to a defined event, such as a trigger scenario, ODLA 413*a* is adapted to capture traffic (multiple states of communication on an interface). In this scenario, protocol exchanges between devices are captured. And after the data is processed, high-level software is able to create protocol diagrams to validate the correct protocol exchanges are occurring on the interface. Continuing the example above, DFx silicon may either generate or be loaded with a specific trigger scenario associated with processor 410*a* receiving a specific snoop message for a cache line in an exclusive coherency state. And ODLA 413*a* captures information, such as processor 410*a*'s response to such as snoop message, in a section of memory 420*a*. Through an API provided by VCU 412*a*, third-party vendor (TPV) application with the appropriate access are able to build a protocol based on the information held in the second of memory 420*a* to validate that the appropriate response was given to the specific snoop message under the circumstances of the defined state.

As can be seen from this example, similar methods and apparatus may be utilized to validate both the electrical properties and protocols, such as the MESIF cache coherent protocols introduced above, of QPI interconnect 450. And the illustrative example of validating QPI interconnect 450 may be extrapolated to demonstrate how on-silicon hooks are able to provide validation for any interface, such as a layered interconnect architecture.

Beyond ODLA 413*a* and validation hooks for internal and external interfaces of processor 410*a*, other silicon hooks may also be integrated in processor 410*a*. For example, specific microarchitectural hooks, in one embodiment, are include in processor 410*a*. For example, a co-pending application with Ser. No. 11/143,425, entitled, "ENHANCEMENTS TO PERFORMANCE MONITORING ARCHITECTURE FOR CRITICAL PATH-BASED ANALYSIS," discusses an apparatus and method for monitoring the performance of a microarchitecture. Performance is monitored through simulation, analytical reasoning, retirement pushout measurement, overall execution time, and other methods of determining per instance event costs. As a result, similar apparatus' may be included in silicon to tag/count instructions based on microarchitectural events, measure retirement pushouts, determine overall execution time of instructions/programs, and validate/debug any other known feature of a processor.

As another example, processor 410*a* illustrates a Power Control Unit (PCU) 414*a* to coordinate and control power, such as power states of processing elements in processor 410*a*. In addition, DFx hooks may be included with PCU 414*a* to capture different power validation metrics, such as power consumption levels, amount of time spent in different power states, the frequency of power state transitions, the protocol of power state transitions, and any other known power related metric. Similar to ODLA 413*a*'s operation, power information may be collected during normal operation, collected during a test mode with specific worst-case power scenarios (i.e. worst-case power resonant frequencies as generated by worst-case patterns transmitted on interfaces) as provided stimuli, or in response to encountering trigger scenarios. Power DFx and operation is discussed in more detail below in regards to FIG. 28.

Again moving away from the illustrative, processor-centric DFx, which may be similarly included in any device within an electronic system, other platform-level DFx may be included. Note that the DFx (debug) features described above and below, may be implemented individually without other parts of the test architecture described herein. For example, the capture of signal information early in a boot process, as discussed in more detail with reference to FIGS. 6-8, may be implemented on a legacy system without a Validation Control Unit or layered, abstracted access.

Figure 6:
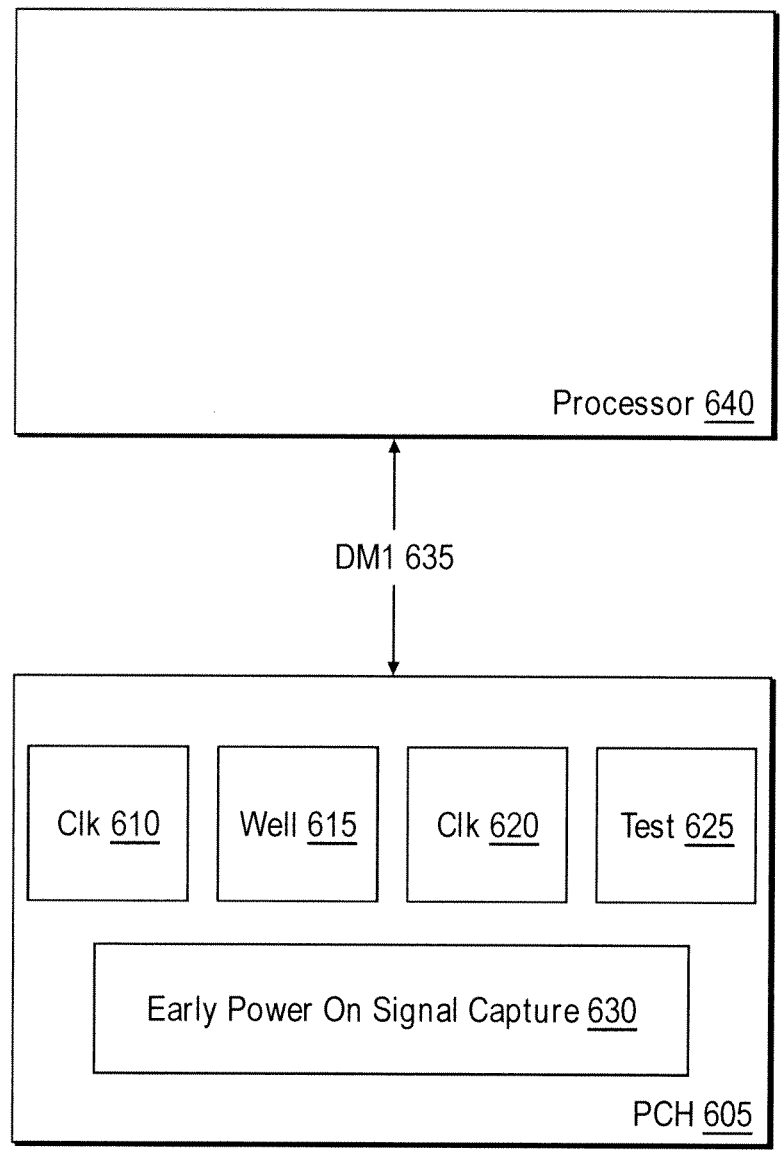
FIG. 6 illustrates an embodiment of a block diagram for capturing early-power on signal information is illustrated.

Turning to FIG. 6, an embodiment of a block diagram for capturing early-power on signal information is illustrated. Here, PCH 605 is coupled to processor 640 through a direct media interface (DMI) 635. Normally, during power-on, PCH 605 is powered-up first. And as most silicon devices, PCH 605 is powered up in stages. For examples, certain wells are powered up in a specific order. As purely illustrative example, clocks 610 are powered on first; those being followed by wells 615 and 620, such as a suspend well, an active well, a real time clock well, etc. Finally, test logic 625, such as a manageability engine and/or test access port (TAP), is enabled.

In some circumstances, certain power-on or early signals that transition before test logic 625 is enabled are not visible (there is no visibility into any issue with those signals), because any transition information associated with those signals is often lost by the time test logic 625 is enabled in the boot process. Yet, during validation and debug, it may be advantageous to be able to view and capture information about such signals. An illustrative example of such a signal includes a power management controller reset signal. Here, a transition of this signal instructs the power management controller to start fetching and executing. So, being able to determine: (1) if the signal did not transition; (2) if the signal did transition; and/or (3) when the signal transitioned, aids in debugging a scenario where the power management controller hangs (a 'stuck' scenario).

Therefore, in one embodiment, early power on signal capture logic (may also be referred to as early boot test logic) is to capture early signal information before a device is fully powered on. Any known method or apparatus for capturing signal information, such as traces, may be utilized. Here, capture logic 630 includes logic adapted to capture specific signal information after initial power-on and store such signal information. And subsequently, when test logic 625 becomes enabled, the information may be read out to perform appropriate debugging operations.

Figure 7:
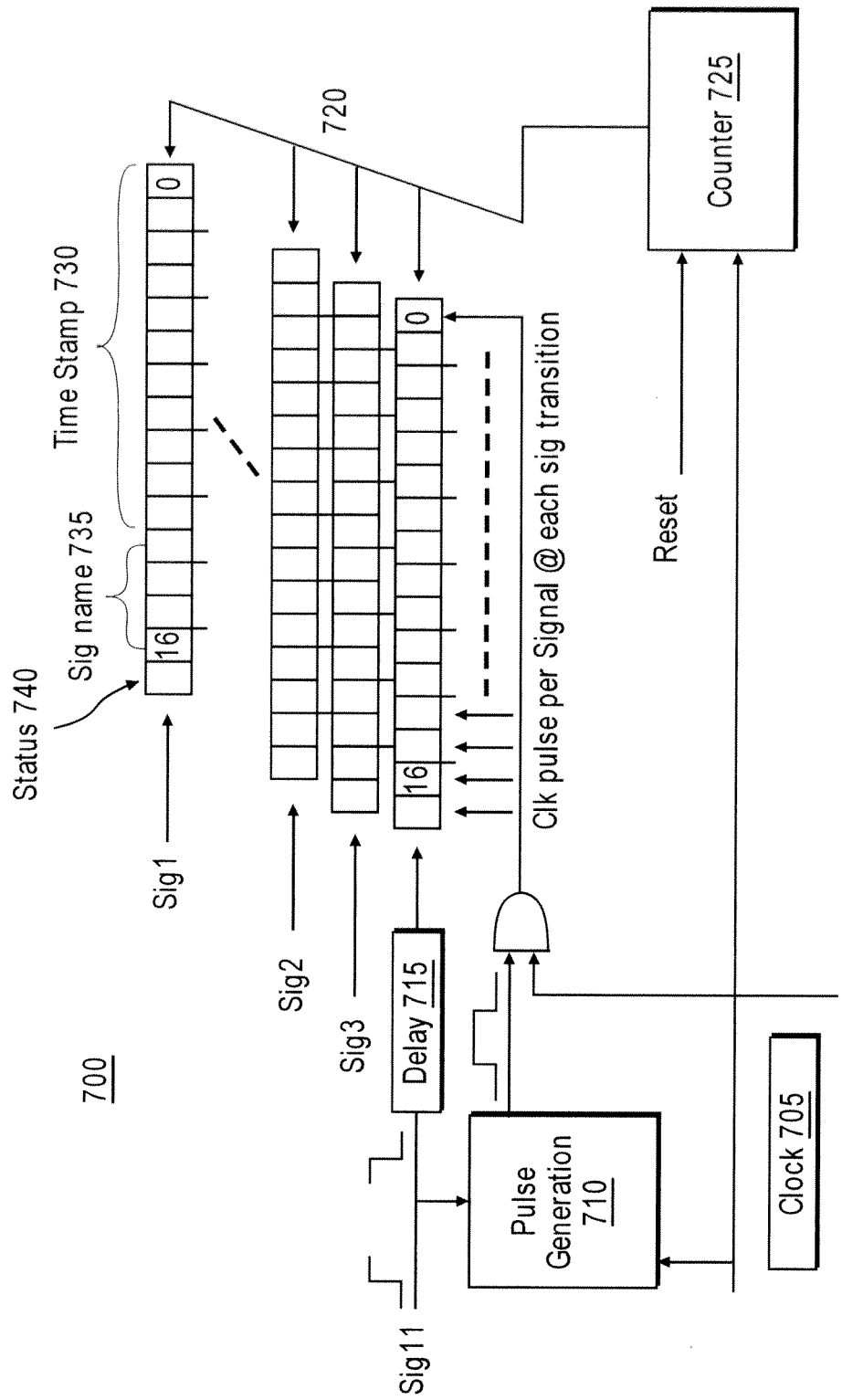
FIG. 7 illustrates an embodiment of high-level block diagram of capture logic for capturing early signals during boot of an electronic system.

Turning to FIG. 7, an embodiment of a high-level block diagram of capture logic for capturing early signals during boot of an electronic system is depicted. As illustrated, capture logic 700 includes storage elements 720, such as registers, that are adapted to capture/hold information about signals of interest (i.e. the signals to be monitored during boot, such as sig 1, 2, 3 . . . 11). In one embodiment, upon applying power, capture logic 700 begins capturing signal information as a default, pre-configured setting (without any need for user triggering or third-party access/programming).

As another example, capture begins upon occurrence of a specific condition, such as transition of a specific signal/clock, or a specific well being enabled. Similarly, the signal capture may be halted upon occurrence of a condition, such as after an amount time/cycles, an amount of time without detecting a transition of a signal(s) of interest, when a last signal of interest transitions, when a last signal of interest doesn't transition after an amount of time, when a specific well is enabled, when test logic is enabled, when a program indicates capture should stop, or upon any other known event.

Although any known apparatus or method for capturing signal information (a time of transition, a number of transitions, a direction of transition, a trace, etc.) may be utilized, a specific illustrative embodiment is discussed in reference to FIG. 7. In this scenario, registers 720 record a time of when a signal of interest (or when each signal of interest) transitions. For example, registers 720 includes a signal name field and a timestamp field. The signal name field being adapted to hold a bit representation that identifies a signal of interest (i.e. a bit pattern that is recognizable as corresponding to a specific signal of interest). And the timestamp field being adapted to hold a bit representation of a time corresponding to a transition of the signal identified in the signal name field. Note that in one scenario, the timestamp value is deterministic across silicon skew of a device, such as PCH 605 from FIG. 6. Here, timestamps are deterministic across silicon skews that are to be used for debug.

Additionally, registers 720 may hold a status field, which is adapted to hold a valid value to indicate the signal name field and timestamp field hold valid information. Conversely, an invalid value indicates that state of the corresponding fields in the same register are invalid. In one embodiment, registers 720 include a register array to hold information regarding all signals of interest, as decided by a designer or later updated by a manufacturer. Furthermore, registers 720 may be implemented as a circular buffer with a depth of N (N being a positive integer); so a last set of N entries will be captured to enable identification of issues in a last N power state transitions.

To provide an even more specific illustrative example, assume the power control unit reset signal (sig. 11) is to be captured/monitored. Here, a power on signal starts the boot process. And a device, such as PCH 605, begins to power-up. Note registers 720 may be initialized to a default value. In response to the power-on signal or other transition of an early start-up signal, counter 725 begins counting. When sig. 11 transitions, it causes pulse generation logic 710, which may also include edge detection logic for sig. 11 (not shown), to generate a pulse. As a result, a bit pattern identifying sig. 11 (power control unit reset signal) is stored into signal name filed 735. Note other information may also be stored, such as a bit indicating the direction of the transition. In addition, to updating signal name field, the value of counter 725 (a timestamp) is stored into timestamp field 730. And status field 740 is set to a valid value, such as a high-logical value to indicate the values held in signal name field 735 and timestamp field 730 are valid.

Here, the process may repeat for transitions of more signals. And as stated above, a circular buffer organization may be used to maintain information for as many power state transitions as the depth of the circular buffer. Moreover, when a signal transition is captured, counter 725, in one example, continues counting (an absolute timestamp from the beginning count). And in another example, counter 725 is reset (a relative timestamp from a previous signal transition). Furthermore, as mentioned above, capture logic 700 halts signal information capture upon a predetermined event, such as a last signal transition or a lack of a last signal transition after an amount of time (a potential hang or 'stuck' scenario).

After the capture is complete, in one embodiment, registers 720 are capable of being read out (i.e. the signal information is viewable to perform any necessary debug on the signal transitions or lack thereof). In one embodiment, in a legacy system, a legacy test access port is utilized to physically connect and read out the register information. In one illustrative example, such a read is not masked or locked out through fuses, and it may be performed any time after a manageability engine or test port is enabled. In another embodiment, access to register 720 is provided and controlled by a validation architecture, as described herein. For example, a Validation Control Unit (VCU) potentially provides abstracted and secure access to the registers. Here, software is able to request the information through the use of an API. And the VCU is able to read out the information from registers 720 and provide it to requesting software. Note that as described herein, either instead of registers 720 or in combination therewith, captured information may be placed in system memory, as discussed above in reference to utilizing system memory as a trace buffer for an ODLA.

It is important to note that the discussion above has primarily focused on capturing traces for signal within a controller hub during power-on. However, the apparatus and method described herein for capturing early signal traces is not so limited. In fact, they may be similarly applied to any silicon device before a test module for the device is enabled/ready. For example, a similar apparatus may be implemented in processor 640 or an embedded processor in a small form factor device to capture signal information before a test/validation unit associated therewith is enabled.

Figure 8:
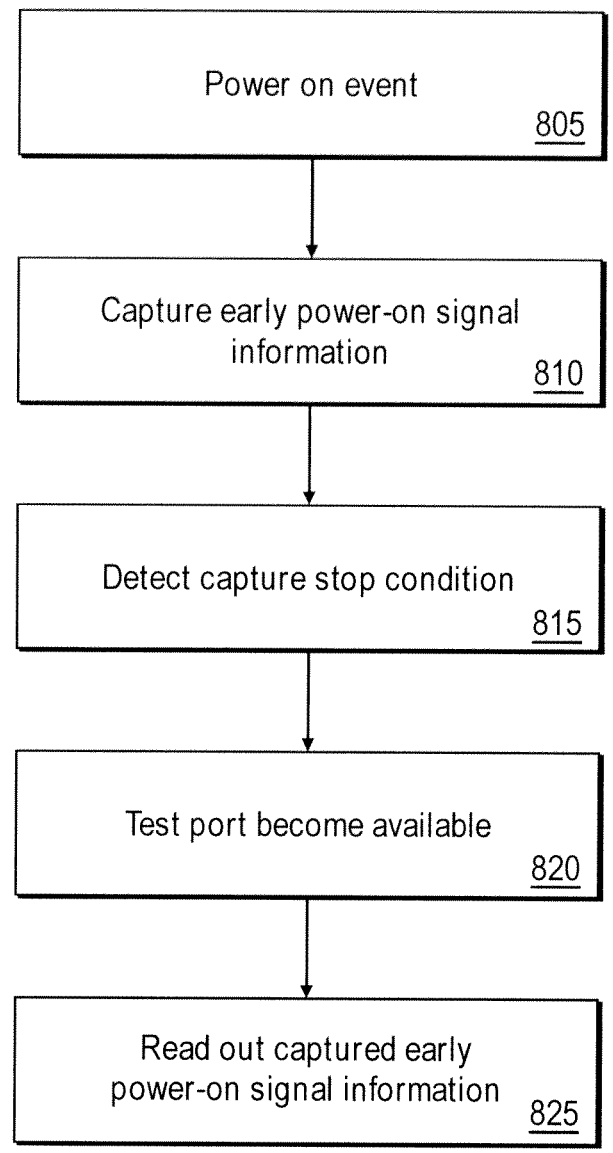
FIG. 8 illustrates an embodiment of a flow diagram for a method of capturing signal information early in a power sequence.

Referencing FIG. 8, an embodiment of a flow diagram for a method of capturing signal information early in a power sequence is depicted. In flow 805, a power on event occurs. A power on event may be as simple as assertion (or de-assertion) of a power signal. Yet, in another example, capture occurs in response to the power-on signal, but relies on an intervening signal transition to actually begin capturing information. For example, an internal signal for a controller hub may transition in response to the power-on signal. And the capture of signal information starts in direct response to that intervening, internal signal. Here, the power on event may include the power signal, the transition of the internal signal, or both.

In flow 810, early power-on signal information (information regarding signals that may transition before a test unit is enabled) is captured. As stated above, any known apparatus or method may be utilized to capture such information. For example, a simplified ODLA that is preset to capture information upon a power event may be utilized. As another example, capture logic as described above may be used. Regardless of the apparatus and method, in flow 815 the capture is halted/stopped upon occurrence of a predetermined condition, such as after an amount of time/cycles, an amount of time without detecting a transition of a signal(s) of interest, when a last signal of interest transitions, when a last signal of interest doesn't transition after an amount of time, when a specific well is enable, when test logic is enabled, when a program indicates capture should stop, or upon any other known predetermined boot-up event.

In flow 820, a test port becomes available. For example, a manageability engine test access port is enabled during the boot process. As another illustrative example, a VCU is enabled along with a universal access port, as described below. When the test port is enabled, the signal information captured in flow 810 may be read out, which may be securely through an abstraction layer or directly to a test device. And software or a debugger is able to determine if any problems or issues occurred. Consequently, signals that transition early in a boot process, such as before enabling logic that normally provides visibility to internal signals, are able to be monitored and debugged efficiently without addition of much expense or effort in comparison to previous attempts to debug without such integrated hardware hooks.

Figure 9:
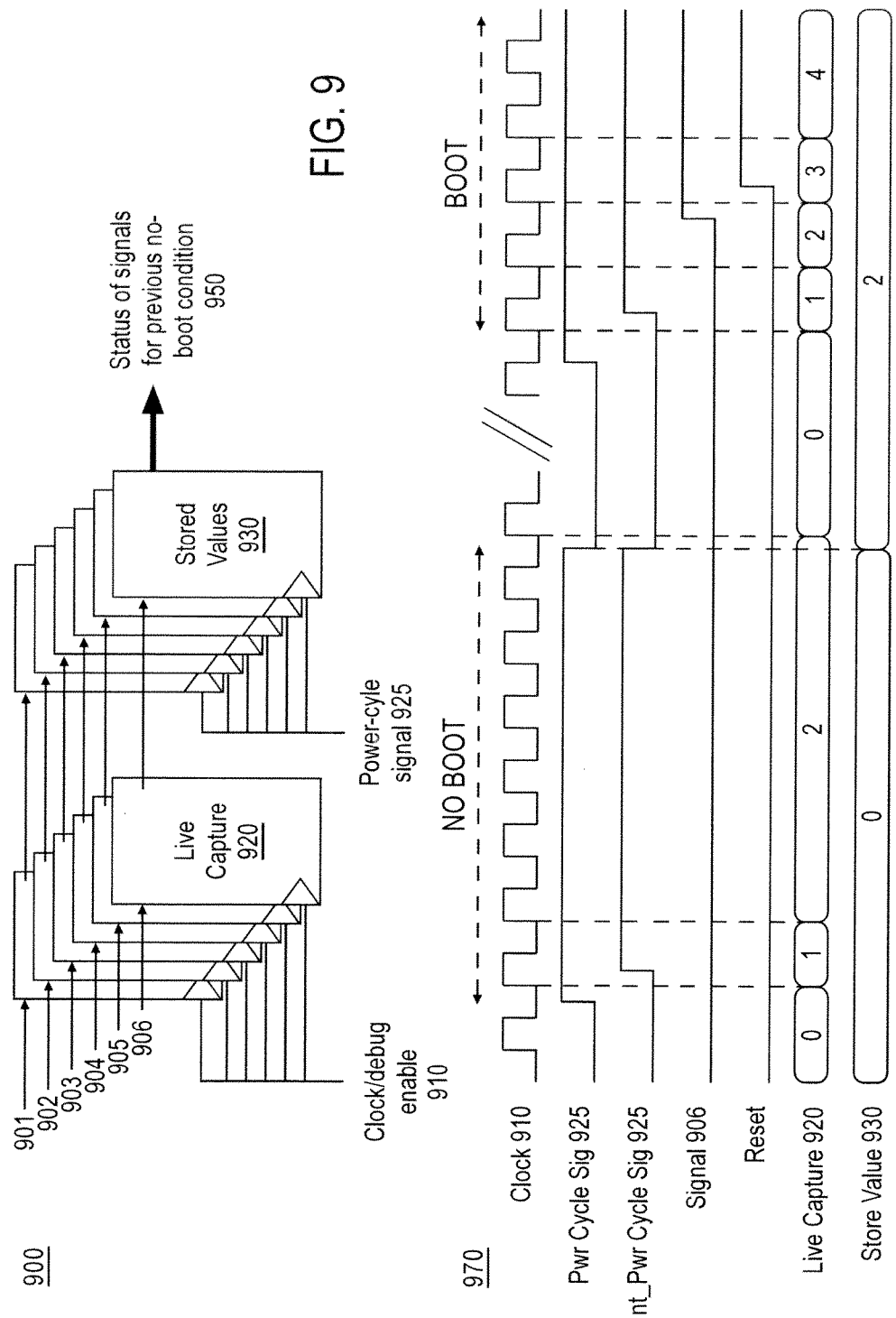
FIG. 9 illustrates an embodiment of illustrative logic to capture signals of interest in low power states.

In addition to DFx features for capturing early power-on signals, as described above, in one embodiment, hooks are included to capture signal traces in an ultra-low power domain. Turning to FIG. 9, an embodiment of illustrative logic to capture signals of interest in low power states is illustrated.

Power states are often defined as product specific; however, in one embodiment, a power state refers to any state with different power specifications, such as an Advanced Configuration and Power Interface (ACPI) speciation of power states. For processors, the ACPI specification defines three basic states: C0 (an operating/active state); C1 (known as halt, where instructions are not executing but can return to an executing state); C2 (known as stop-clock, where software-visible state is maintained but it may take longer to wake up; and C3 (known as Sleep, where the processor does not keep its cache coherent but may maintain other state. In addition, variations have been made on these states. For example, an enhanced C1 state may be utilized for lower power consumption. And variations on C3/Sleep may include deeper sleep states (i.e. C6 being a deeper or deepest sleep state), which require more time to wake a processing element. Note that these power states are purely illustrative and are primarily utilized in reference to a processor. However, similar states are defined by the ACPI specification for other devices, such as a controller hub.

As depicted, device 900, which may include a processor, controller hub, graphics device, or other known computer-related device, includes logic to capture signals of interest 901-906 during a low power state (i.e. any state that is a non-operating C0 state in the example above). The first stage of the logic (live capture 920) captures live traces/values of signals 901-906. For example, timing diagram 970 illustrates the capture of signal 906 based on clock signal 910. Note that an enable signal, such as debug enable, may also be used to constrain clock 910 (i.e. gate clock 910 to flop stages 920, 930) when not in a debug mode. And as can be seen, the second stage (stored values 930) captures the live status of signals 901-906 when a power-cycle is initiated, as indicated by power-cycle signal 925. For example, in a PCH a power-cycle signal may be generated in response to assertion (de-assertion) of a specific, predefined pin. Here, in a no-boot situation, a validation engineer toggles the pin to re-boot the system. Therefore, in this scenario, a most recent version/status of signals 901-906 are captured and stored. Note that in the depicted example, on a successful boot, stored values 930 hold a status 950 of signals 901-906 during a most recent fail-to-boot condition, as illustrated in timing diagram 970.

To provide a specific example to illustrate operation of logic 900, assume five boots of a device/system 900 are attempted. Upon the first boot, the enable bit is set to arm the logic. Here, legacy JTAG or other testing interfaces may be used to set the enable bit. In another embodiment, a VCU sets the enable bit. Assuming the first boot is successful, the power-cycle signal 925 is driven low, so the status of signals 901-906 are captured. Upon a second successful boot, a status indicates all one logical value (a previous successful boot, and the enable bit remains armed). Yet, upon a third boot that is not successful, the system is restarted. Here, the power-cycle signal is toggled, such as from a high to low to high, and the status of signals 901-906 is captured when the power-cycle signal 925 is driven low. Assuming a fourth boot, which is also unsuccessful, the system is restarted in the same manner. And upon a subsequent, fifth successful boot, status 950 will report the trace/status of signals 910-906 for the most recent unsuccessful boot attempt (boot attempt four). As described above, status 950 may be read out by legacy testing equipment. Or in another embodiment, a VCU implementing a layered test architecture is utilized to provide and control access to logic 900.

Much of the above discussion has been in regards to capturing validation information for processors; some of which has been focused on capturing state of signals for a controller hub, such as a PCH. Yet, DFx hooks are not so limited, as they may be implemented in other areas and throughout a platform. Another area that was mentioned briefly above is providing hardware hooks for test, validation, and debug of power associated hardware and power delivery networks. For example, frequency stepping logic or voltage versus time measurement logic may be able to characterize (define an impedance profile and/or determine a resonant frequency) a power delivery network. Or measurement logic may be inserted by a voltage regulator (VR) on a motherboard to measure an amount of current demand, power consumption, noise, etc.

In addition, the DFx and validation architecture described herein is not limited to lab validation. Here, DFx features may be integrated in processors, controller hubs, motherboards, or other devices to interface with high-volume manufacturing (HVM) testing equipment. As a result, any known HVM test may be routed through the universal access port, as described below. And being a manufacturer, any secure, layered validation architecture, in one embodiment, gives the manufacturing testers the highest security clearance (i.e. low level access to most or all of the included DFx features).

As a corollary to providing a testing architecture across products, manufacturing defects may be diagnosed across the products (cross-product validation), such as processors, motherboards, etc. Here, defects and skews may be readily determinable by providing testing results up through the layered test architecture for comprehension by software over multiple products. For example, thousands of a processor may be tested by an HVM with access to DFx through the VCU and layered test architecture. And as the results are gathered into the software/presentation layer, the software is able to formulate the information into presentable information, such as skews, defects, etc.

As another example, previous motherboard diagnostics rely on in-circuit probed tests of a circuit board) testing (ICT) at multiple on-board test points with dedicated, external testers. As form factors have shrunk and test point costs have sky rocketed, it's becoming difficult to continue supporting ICT. As a result, in one embodiment, the test architecture described herein, such as a VCU and provided APIs for higher-level software, is utilized to provide comprehensive diagnostic across devices.

As a result, previous returns of devices, such as processors and chipsets, that are not defective but returned due to motherboard failures ('no-defect-found' returns) may be avoided by providing this elegant, simple solution to testing without a need for ICT. For example, as much as 30% of a test cost may be reduced by integrating DFx and providing support (access and control) of the DFx through a VCU and API's instead of having to use external ICT devices.

Embodiments of a Validation Controller

Figure 10:
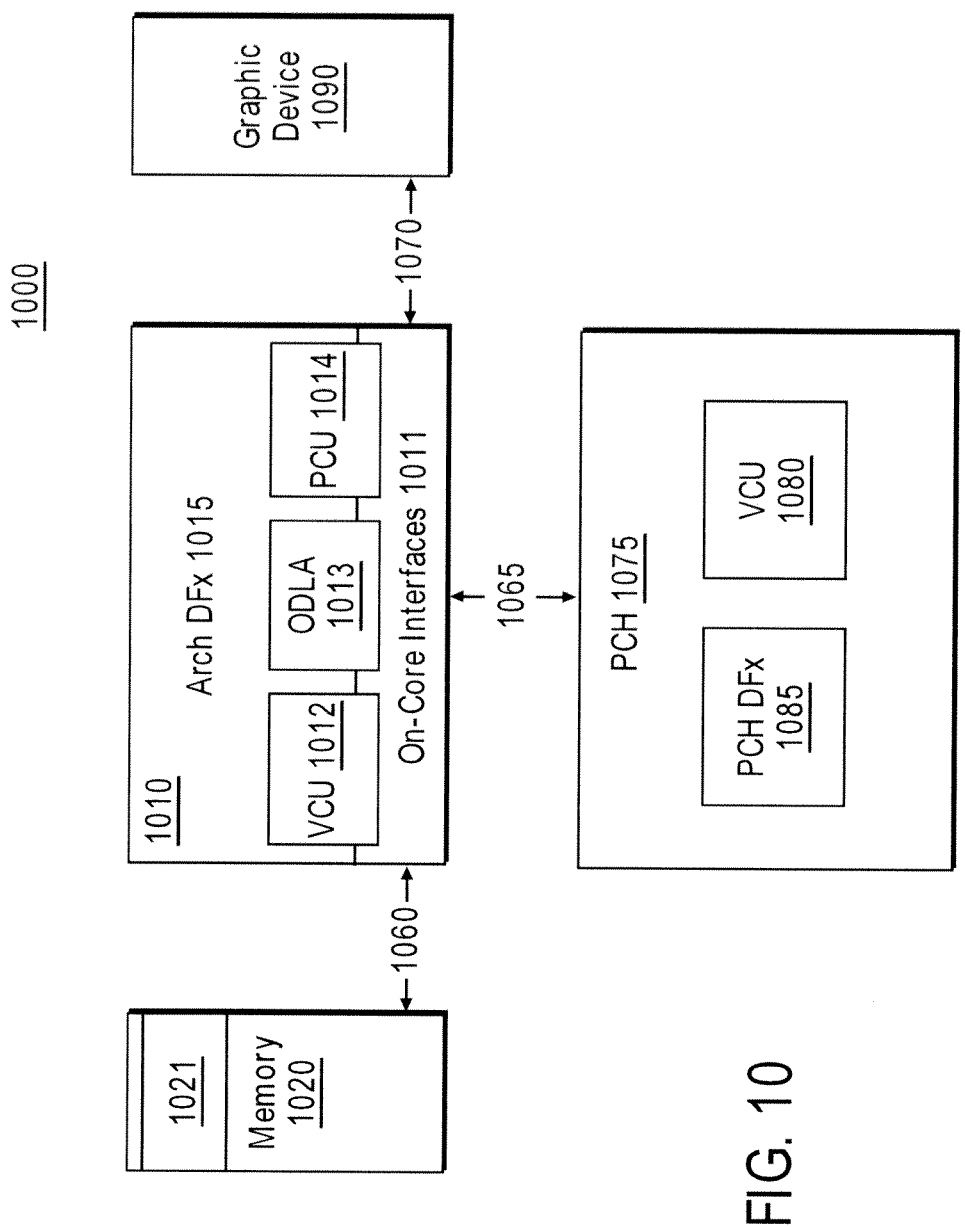
FIG. 10 illustrates an embodiment of an illustrative platform with one or more VCUs.

In one embodiment, a Validation Control Unit (VCU) is included to provide control of and access to DFX features, such as the hardware test, validation, and debug hooks described herein. A VCU may include any hardware, firmware, software, code, micro-code, or combination thereof to implement such control and/or access. Turning to FIG. 10, an embodiment of an illustrative platform with one or more VCUs is depicted. As illustrated, platform 1000 includes multiple VCUs; one in processor 1010 and one in processor 1075. In this scenario, VCUs may be included within multiple devices (processors, controller hubs, graphics devices, a motherboard, or other known computer device). As a result, each may be responsible for access to and control of their respective silicon DFx features. Here, a VCU, such as VCU 1012, is included in each processor, such that it is able to provide access and control to processor 1010's DFX features (Architectural and microarchitectural DFx 1015, ODLA 103, and PCU 1014). Note that this distribution in multiple silicon devices within platform 1000 potentially enables access and control to DFx features during individual part testing (e.g. HVM testing of individual parts) and during platform testing/debugging (e.g. multiple parts integrated into a platform where whole system analysis as well as individual part performance in the system may be useful).

In one example, with such a distributed VCU implementation, the VCUs are capable of communicating with each other. Such communication may be performed directly, such as over a VCU interconnect (not shown) that couples VCUs 1012 and 1080 in platform 1000 together. Alternatively, VCUs, such as VCU 1012 and VCU 1080, may communicate over existing interconnects (interconnect 1065, which may include a Direct Media Interface (DMI), Quickpath interface, PCI-E interface, or other known interconnect) that couple their corresponding devices (processor 1010 and PCH 1075). As another alternative, VCU's may communicate with each other through a shared memory space. For example, VCU 1012 writes to memory portion 1021 that is obfuscated from an operating system but visible to other system devices, such as PCH 1075/VCU 1080. As a result, VCU 1080 is able to read the information written by VCU 1012 and vice-versa.

As a specific illustrative example, when a unified port is provided for access to the validation architecture, as discussed in more detail below, interconnection/communication between VCUs is utilized to coordinate software access to DFx features throughout the platform. In addition other issues may be detected and addressed by communication between VCUs and/or manageability engines, such as livelock, deadlock, patch load synchronization, power/performance state transition synchronization, survivability, triggering and trace configuration, dump data post-collection, security, and capturing/reporting coverage.

Although the discussion above has primarily focused on distribution of a VCU in each part, such as a processor, controller hub, and motherboard, such a distribution is not required. Alternatively, a single VCU is included in a device, such as processor 1010 or PCH 1075. And it controls access to its DFx hooks, as well as to the platform's DFx hooks. Moreover, when a distributed VCU implementation is utilized, the VCUs are not required to be symmetric. In that case, since silicon parts may differ, so may the VCUs. In addition, one or more VCUs may have higher priority (e.g. a head home, or master VCU to coordinate access and control by other VCUs in the system). Alternatively, each VCU may be considered a communication master.

In one embodiment, VCU 1012 includes a programmable engine or unit to control access to DFx features of processor 1010. For example, VCU 1012 includes a microcontroller. A microcontroller often includes a device having its own processing element, memory (flash, programmable ROM, SRAM, or other known memory device), and communication interface. Essentially, it may be viewed as a small, embedded, or self-contained computer within processor 1000. Therefore, it may hold its own code/micro-code, when executed by its processing element, to implement its interface upwards with higher level software and downwards with DFx features. Furthermore, as described in more detail below, the microcontroller may be updated (its controlling or operating code held in its memory patched, such as through an authenticated patch, or updated) to provide new functionality for adapting to changes in other layers (software or DFx features) of a test, validation architecture. Consequently, changes may be made to platform DFx features or higher-level software, and the VCU is able to adapt without replacing hardware (or an entire part).

Note that discussion of a VCU including a microcontroller is purely illustrative. Instead, similar devices may perform similar control of access to DFx features and provide a similar interface to higher-level layers. For example, programmable logic devices, such as programmable array logic devices, generic array logic devices, complex programmable logic devices, field-programmable gate array devices, etc., may be utilized. In addition, VCU 1012 is illustrated as a single, logical block in processor 1010. Yet, just as an ODLA may be distributed throughout processor 1010, so may parts of VCU 1012 be distributed through different sections of a die or package of processor 1010.

An illustrative example of VCU 1012 interaction with some DFx features is included immediately below to further the discussion. Here, VCU 1012 has access to channels in on-core interface 1011, such as a message channel that is coupled to control registers of processor 1010. In addition, VCU 1012 has access to scan signals, such as scanout signals and fuses. As a result, VCU 1012 is capable of programming various microbreakpoint trigger events (a scenario), direct ODLA 1013 to store traces in memory 1020 (or a portion of memory 1021 sequestered from an Operating System), extract traces stored in memory 1020, and deliver traces to higher-level software (e.g. a debug tool). Additionally, VCU 1010 is able to control which DFx features may be accessed based on a current security (unlock) level. And in one embodiment, VCU 1010 exposes an API that tools are able to program to for access to processor 1010's DFx features.

In one embodiment, VCU 1012 is responsible for implementing one or more layers of the validation layered architecture described below, such as an abstraction layer to abstract or obfuscate hardware details of DFx features from higher level software. Also whether an abstraction layer is utilized or not, in one embodiment, VCU 1012 is responsible for secured access to DFx features, as described below in the embodiments of validation infrastructure security section.

Figure 11:
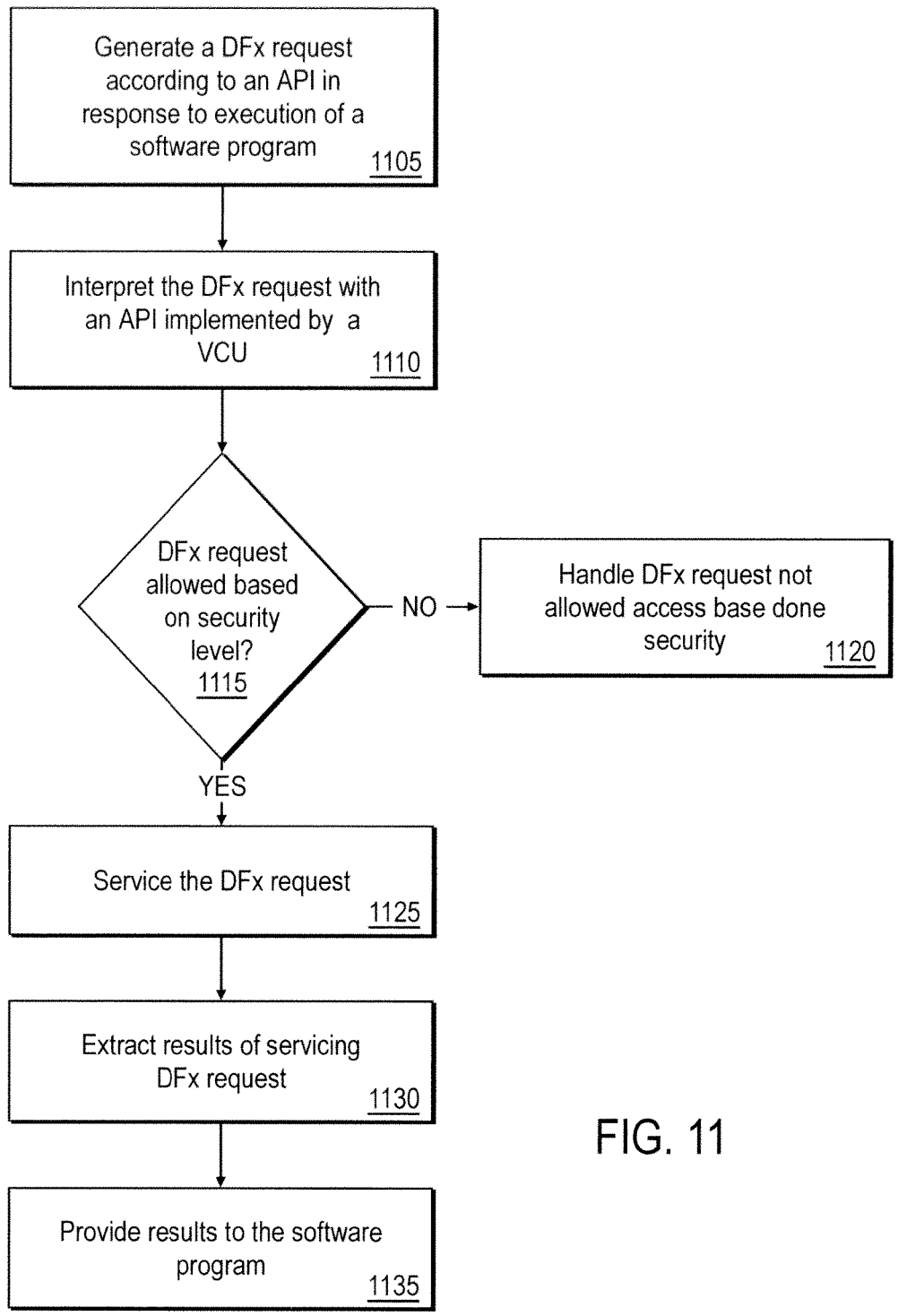
FIG. 11 illustrates an embodiment of a flow diagram for a method of servicing a DFx request from software utilizing a VCU.

Turning to FIG. 11, an embodiment of a flow diagram for a method of servicing a DFx request from software utilizing a VCU is illustrated. In flow 1105, a DFx request is generated according to an Application Programming Interface (API) in response to executing a software program, such as a test and debug program from a third party vendor.

Here, the DFx request may comply with the API's a specification and rules provided to interact with services and routines provide by a VCU. In other words, the software program may be written to comply with the 'vocabulary' specified by the API, such as calling conventions recognized by the API.

In flow 1110, the DFx request is interpreted with the API implemented by the VCU. Here, the API is working as an interface or facilitator between software and DFx hardware. As an example, code stored in the VCU, such as code stored in memory of a VCU microcontroller, is executed in response to the DFx request. In this scenario, the code stored in the VCU may include libraries, routines, data structures, object classes, protocols, etc. Here, assume the DFx request includes a call to a routine in the VCU, which is to cause execution of the routine on the VCU to perform some function/operation associated with the DFx hardware.

In one embodiment, as described in more detail below, a VCU is to control access to DFx hardware (security). Therefore, in flow 1115 it's determined if the DFx request is allowed based on a security level. Although security is discussed in more detail below, a simplified example is provided at this point to continue illustrative operation of a VCU. So as an example, a VCU may include a number of levels of secure access; each of which allow different levels of access to hardware DFx. For example, each level may be associated with an encrypted passcode. So when the software program begins executing, it may provide a secure passcode to unlock its security level, which designates what features the software program is able to access. Therefore, in flow 1115, according to the levels of access predefined by the VCU, it's determined if the DFx request is allowable within the security level associated with the software program. If the DFx request is not allowed, then in flow 1120 it may be handled appropriately (denied, not performed, throw an exception, etc.).

On the other hand, if the DFx request is allowed, then in flow 1125 the DFx request is serviced. Continuing the example above, where the DFx request include a call to a service routine defined by the API, then the VCU executes the service routine. Here, the service routine may include any routine to setup, initiate, or interact with hardware DFx features, as described above. For example, the VCU may set microbreakpoint trigger events, which causes a processor to encounter the trigger events and an ODLA to capture traces at the breakpoint. The results (traces) may then be extracted in flow 1130, such as written out to a memory that is utilized as a trace buffer by the ODLA. And the results are provided to the software program in flow 1135. In this scenario, the software program is able to read the memory to obtain the trace information for later interpretation/debugging.

Figure 12:
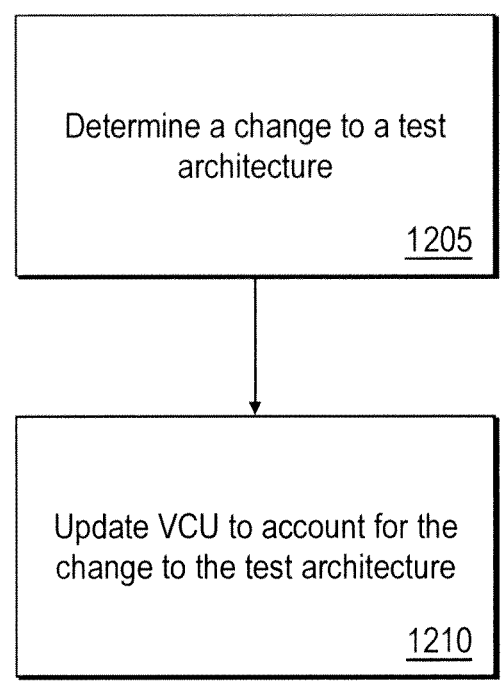
FIG. 12 illustrates an embodiment of updating a test architecture to account for a change therein is illustrated.

Turning to FIG. 12, a change to a test architecture is determined in flow 1205. A change may include any change within any layer of the architecture, such as a change to DFx hardware, a change to be made in how a VCU interacts with another VCU, a change in how a VCU interact with DFx hardware, a change in service provide by a VCU, a change in security levels (what they each allow access to), a change in the API specification, etc. And in flow 1210, the VCU is updated to account for the change to the test architecture. Here, a patch, authenticated patch, or updated may be applied, either locally or remotely, to update VCU code to account for the change. As a result, when something at the VCU level or below in the layered stack changes, a manufacturer only has to provide an update to VCU software. And since in this example, only the API is exposed to higher-level software, third-party vendors don't have to update their software programs or tools. Instead, the API stays the same, but the action of the VCU is modified based on the update to account for the change in the test architecture. Consequently, both expense (cost of redesigning or replacing hardware) and time are potentially saved by not having to modify all levels of a stack, when there is a minor change to the test architecture stack.

Embodiments of a Validation Layered Architecture

Figure 13:
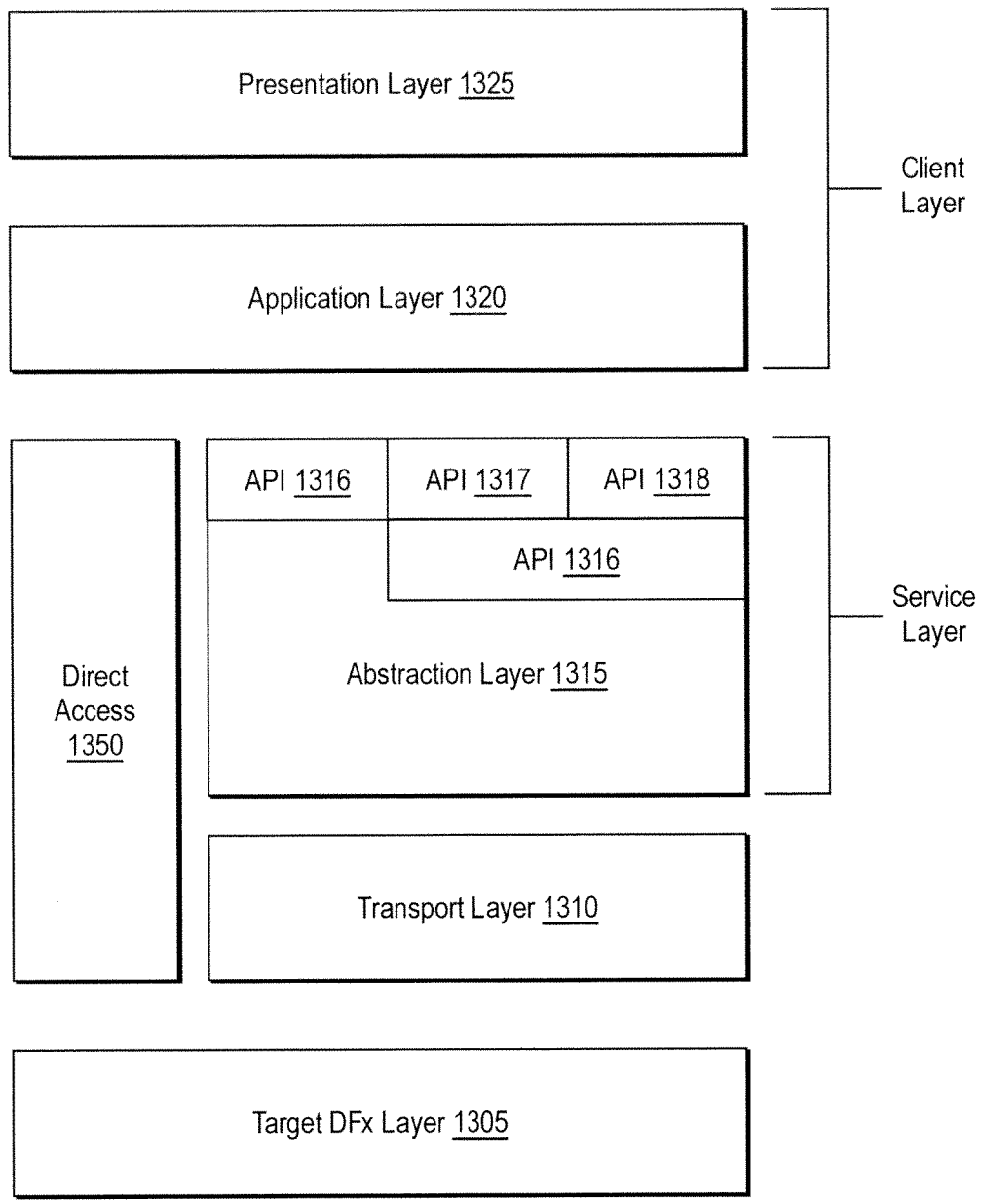
FIG. 13 illustrates an embodiment of a layered stack for a test architecture.

As alluded to above, a test, validation, and debug architecture, in one embodiment, is implemented in a layered stack. An embodiment of a layered stack for a test architecture is illustrated in FIG. 13. Note that the layers depicted are purely illustrative. And other layers may be included, while any of the illustrated layers may be omitted. Furthermore, examples of logic, such as a VCU, to implement one or more of the illustrated layers, such as abstraction layer 1315, are also illustrative, as the layers may be implemented in logic, hardware, firmware, code, micro-code, software, or a combination thereof.

In one embodiment, stack 1300 is to obfuscate implementation details of hardware DFx. Here, abstraction layer 1315 (a service layer) is provided to abstract such hardware DFx details, while providing an interface to a client layer (application layer 1320 and presentation layer 1325). As depicted the interface provided to application layer 1320 is comprised of multiple APIs (API 1316, 1317, and 1318).

An API typically refers to a particular set of rules and specifications that a software layer, such as application layer 1320, is to adhere to for access and use of services provided thereby. Essentially, it provides an interface between different layers (of software, firmware or hardware) and facilitates their interaction. An API may be accessed by layer 1320 and 1325, which may include consoles, tools, software, operating systems, libraries, applications, or other known structure that is capable of interfacing with or programming to an API. As a specific illustrative example, an API includes specifications for services, routines, functions, data structures, object class, protocols, or other known API related construct.

Although one API may be utilized, in the depicted embodiment, different APIs are provided for access to different services, routines, and data structures provided by abstraction layer 1315. For example, API(s) 1316 may provide core services and data structures to be used by application layer 1320 for security (as discussed in more detail below) and abstraction of low-level details, which potentially results in reduced generational tool turnover (use of the same tools to interface with the same APIs on a next generation processor with different abstraction layer 1315 services and/or different DFx features.

In addition, other APIs, such as APIs 1317 and 1318, may provide other services, data structures, and abstractions. As an example, hardware DFx is not the only abstraction provided by layer 1315. Here, APIs 1317 and 1318 provide services and data structures associated with Electrical Validation (EV), power delivery, manageability, security, access, or other known test, validation, or debug related pillars. Previously, manufacturers have been protective of certain algorithms, such as Electrical Validation (EV) algorithms, to be used by tools that reside in the client layer. So, currently the algorithms are not provided or only a subset thereof is provided, which often results in substandard vendor tools for EV.

Consequently, in one embodiment API 1317 includes an EV pillar API(s) to provide abstraction of a full set of such algorithms to be utilized by tools/software in higher-level layers 1320, 1325. Therefore, the algorithms may be provided in a secure manner (not visible to TPV tools), resulting in better TPV testing tools, while any secret algorithms remain secret, abstracted. Note that the example of an EV specific API pillar may be extrapolated to any individual test, validation, and/or debug related API pillar that is to abstract hardware, firmware, software, code, algorithms, protocols, etc. Moreover, providing pillar-specific API service modules, as shown, potentially allows for easier, modular updates. For example, if something associated with EV is to be modified, then an update, such as a patch of EV code stored in a VCU micro-controller that implements EV API 1317, is potentially performed without having to update core services or other API modules.

In the examples above, reference to an interface between abstraction layer 1315 and the client layer (application layer 1320 and presentation layer 1325) has been primarily discussed in regards to APIs. However, any known apparatus or method for providing an interface that obscures, abstracts, or obfuscates low-level details from a lower-level, such as hardware or algorithms implemented in software/hardware, may be utilized. In addition, an example of abstraction layer 1315 is implemented by a VCU microcontroller, as mentioned above. Here, logic and or code to implement APIs 1316-1318 are included in a VCU, such as code stored in a memory device of the VCU microcontroller. In another embodiment, the code, services and data structures to implement APIs for abstraction layer 1315 are held in memory and executed by the device under test, such as a processor under test.

As shown, the lowest layer in the stack includes target DFx layer 1305, which may include any known DFx feature, such as the hardware features/hooks described above. In addition, DFx layer 1305 may also include legacy testing/validation features. And as a result, direct access 1350 may, in some embodiments, allow direct access to some of the hardware DFx features in layer 1305. As another example, target DFx layer 1305 includes a unit under test, which may include a processor, PCH, graphics device, motherboard, or other electronic device.

Transport layer 1310 is to adapt communication, such tasks from the services and routines provided by abstraction layer 1315, that are transport-agnostic (i.e. unaware of how the service/routines are transported to DFx layer 1305) to run on a specific transport vehicle. For example, transport layer 1310 includes transport hardware and associated drivers to take communication from abstraction layer 1315 and adapt them into appropriate packets/information for transport to layer 1305. Here, the transport medium may include an interconnect within a platform, an interconnect coupling a console/tester to a platform or device through a port, a network for remote access between layer 1315 on a host machine and layer 1305 on a remote unit under test, or other known test related device, such as an In-Target Probe (ITP) device, a defined debug port, a third party vendor (TPV) transport device.

As can be inferred from the network example, one or more layers of stack 1300 may be implemented on different machines and/or components. For example, target layer 1305 may include a platform under test that is remotely connected to a host platform that implements one or more layers of the rest of the stack. As another example, a client layer is implemented on a host system that remotely accesses a part or platform under test, which implements the service layer and target layer 1305. Remote access is described in more detail below in the embodiments of validation architecture access.

A client layer may include any tool, console, application, or other entity for interfacing with DFx features in target layer 1305 and/or abstraction layer 1315, which is to abstract low-level details of DFx layer 1305. When the interface with abstraction layer 1315 is through one or more APIs, such as APIs 1316-1318, application layer 1320 is designed to interface with/program to the APIs according to their specifications and rules, including the rules and specifications of pillar-specific API modules. Furthermore, as stated above, even when new generation products are provided, as long as the API communication specification between client layers and abstraction layer 1315 remain the same, then the client layer tools don't have to be changed out for newer versions. Instead, the abstraction layer is updated to provide the same services in a new manner with respect to the new product (target DFx layer 1305). Additionally, third party legacy and non-service applications may be integrated with manufacturer collateral into one or more tool solutions within the client layer The presentation layer may be integrated with a tool or a separate entity, which is to correlate, visualize, and/or present underlying data and protocols. As a result, these tools may be designed by and with the preference of third parties to formulate final results from DFx testing in any manner they so choose. In this example, application layer 1320 is to program to abstraction layer 1315 using services and routines provided therein. Results from those services and routines, such as results of testing in layer 1305 or output of algorithms that reside in layer 1315, are passed up to application layer 1325. Application layer passes this data to presentation layer, which interprets (debugs) and presents the data for human or further tool interpretation.

Figure 14:
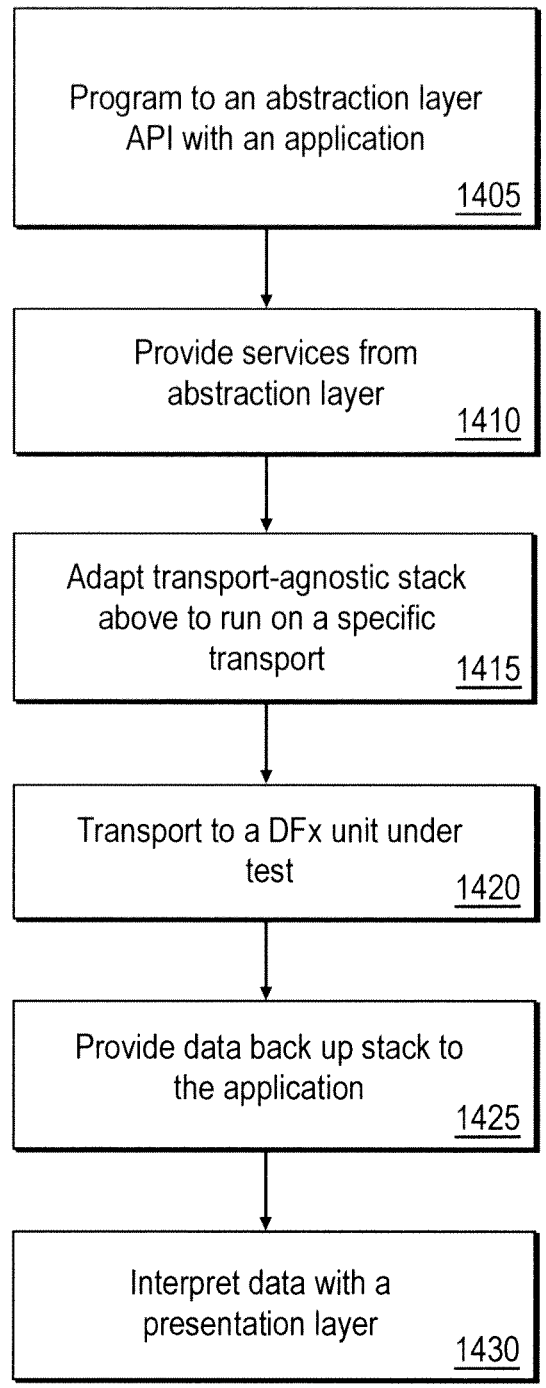
FIG. 14 illustrates an embodiment of a flow diagram for a method of accessing DFx features through a layered architecture stack.

Turning to FIG. 14, an embodiment of a flow diagram for a method of accessing DFx features through a layered architecture stack is illustrated. In flow 1405, an application, such as a third party vendor tool, programs to an abstraction layer. Here, a tool or other entity requests/uses services from an abstraction layer as defined by an API associated with the abstraction layer. And such services are provided in flow 1410. Note where the service includes a local algorithm within an abstraction layer, the information/data structure may be provided back to the application layer.

On the other hand, if the service includes downward communication with DFx features or a target device under test, then in flow 1415 the communication from the higher-level transport agnostic stack (the abstraction layer and application layer) is adapted to be transported. For example, the adaption may include formatting information from the abstraction layer into a transport protocol, such as a test port protocol, interconnect protocol, network protocol, or internet protocol. In flow 1420, the adapted form of communication is transported to a DFX unit under test, which performs the operations requested by the abstraction layer. Note that any known DFx operation, such as those described above, may be performed. The results may then be provided back to the application in flow 1425 and interpreted by a presentation layer in flow 1430.

Continuing a common example from above to illustrate the flow, assume a test and debug tool request a microbreakpoint to be programmed into a unit under test, such as a processor, and traces captured up to, at or after the mircrobreakpoint. In this example, the application may call a service provided by the application layer (flow 1405). The abstraction layer executes the called service routine, which includes transmitting a microbreakpoint definition and trace capture directions down in the stack (flow 1410). The transport layer adapts the microbreakpoint definition and trace capture from transport, such as forming them into packets to be transported through a test port (flow 1415). The formulated packets are transmitted to the processor (flow 1420). In response, the microbreakpoint is set in control registers of the processor and the trace information is captured as requested. Here, the return of data may include a pass back up the stack, such as through an abstraction layer, back to the application (flow 1425). As another example, the trace information may be stored into a memory, which is utilized as a trace buffer. And the application is able to read the trace information back from the memory (flow 1425). With the trace information, a presentation tool is able to recreate the processor traces in simulation to interpret the data (flow 1430). Note that the accessibility of features below the abstraction layer may be secured, i.e. access requests from the application to features that are not unlocked or beyond the applications security/privilege level may be denied. Such potential security enhancements are discussed immediately below.

Embodiments of Security for a Validation Architecture

As mentioned above, one potential objective of a test, validation, and debug architecture includes abstracting low-level details that a designer or manufacturer does not want to expose. However, pure abstraction or obfuscation of such details, in one embodiment, may not be enough 'security.' If only an abstraction layer were utilized, then anyone, including an end user, may be able to access the test architecture if they determined how to communicate with the abstraction layer APIs. As a result, in one embodiment, access to the test architecture is secured, i.e. requests from higher-level layers that are not authorized are not allowed.

Figure 15:
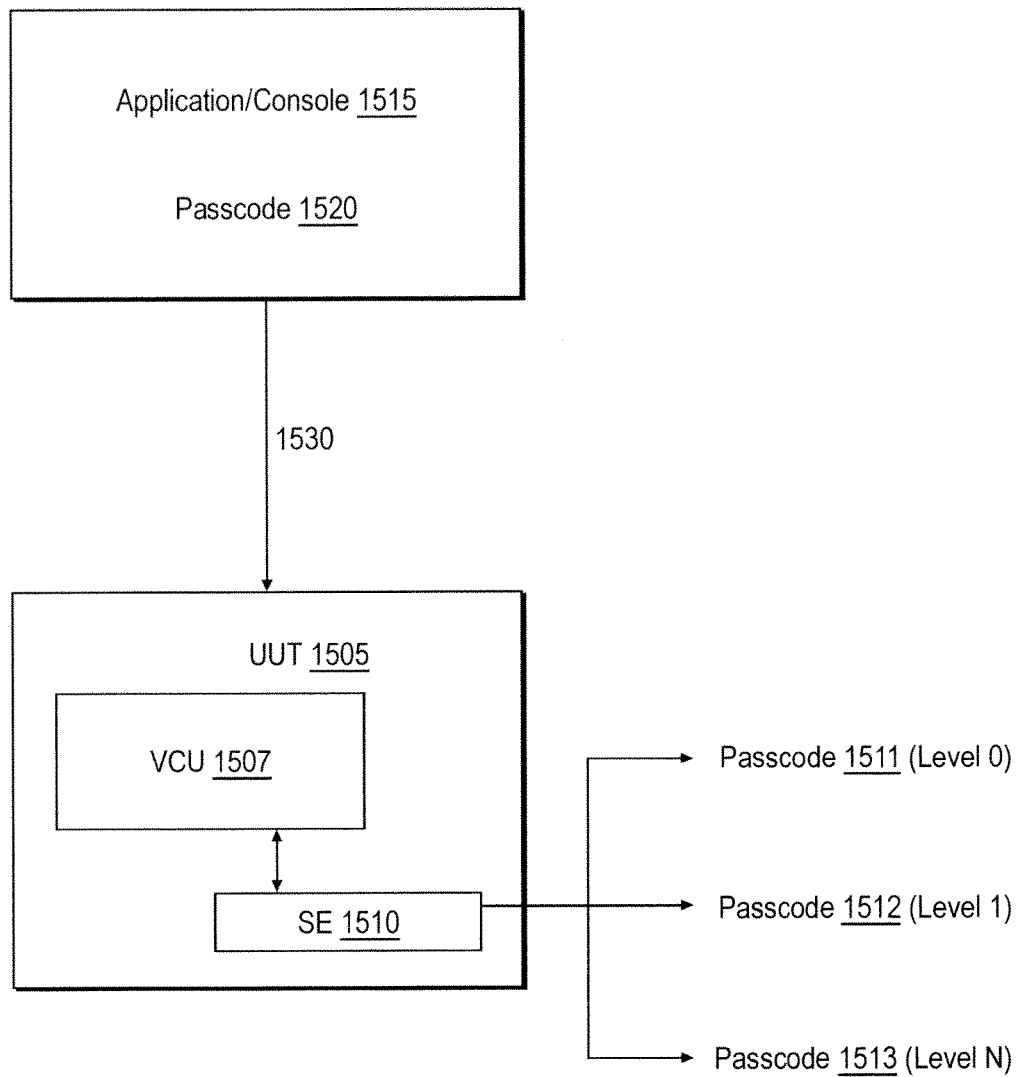
FIG. 15 illustrates an embodiment of logic to provide secure access to a test architecture

FIG. 15 illustrates one embodiment of logic to provide secure access to a test architecture. Here, an application or console 1515, which may include any of the entities described above in reference to an application or presentation layer, includes a passcode 1520. Passcode 1520, which may also be referred to as a key, includes any known format of value that is to provide secure or locking access to a feature or level of access. Either upon initial interaction, or subsequently upon a request, application 1515 provides its passcode 1520 to an abstraction layer over interface 1530, such as an API interface implemented by VCU 1507. Note that the topology of application 1515 as logically separate from UUT 1505 is only illustrative. Instead, UUT 1505 may be executing the application. Or VCU 1507 may be implemented in device 1515, which in this scenario is considered a host system/console accessing UUT 1505.

Regardless of the physical implementation, when the abstraction layer receives passcode 1520 it provides an amount of access to application 1515 based on the application passcode in comparison to a stored passcode held in storage element 1510, such as a general register, control register, or model specific register (MSR), of UUT 1505. As one example, there is only one level of access (full access or no access). Here, if application passcode 1520 matches a passcode held in storage element 1510, then application 1520 may utilize al the provided services (access to associated DFx features) of an abstraction layer implemented by VCU 1507. Alternatively, if no passcode is provided or if it does not match, then requests to the abstraction layer from application 1515 are not serviced/allowed.

Yet, in one embodiment, multiple levels of security are provided. For example, a designer may want different customers or vendors to have different access levels to algorithms, protocols, data structures, DFx features, etc. In fact, a designer/manufacturer may want to provide itself unobstructed access to the low level details of DFx features that an abstraction layer is to obfuscate to both test, validate, and debug the DFx features, as well as the associated UUT. Similarly, a designer/manufacturer may provide itself full access within the abstraction layer.

In the depicted embodiment, storage element(s) 1510 are to hold three levels of passcodes. One passcode (passcode 1511) is a manufacturer passcode to provide level 0 access (unbridled or not very limited) access to DFx features. A second level (level 1) represented by passcode 1512 that provides some selective/limited access to the test architecture. And an Nth level represented by passcode 1513, which provides even more selectively limited access to the test architecture. Here, each of the passcode may be securely provided, such as passcode 1512 to a third party vendor (TPV). As a result, when designing a TPV tool they are able to integrate or utilize passcode 1512 as passcode 1520. Therefore, when application 1515 goes through an authentication process (provides passcode 1520 to an abstraction or security layer implemented by VCU 1507), it is provided the level 1 access to the test architecture. In this case, the level one access is restricted. So an access from application 1515 that that is not within its security level (an access to a DFx feature or implementation detail that is restricted) is denied (not allowed) by VCU 1507.

Figure 16:
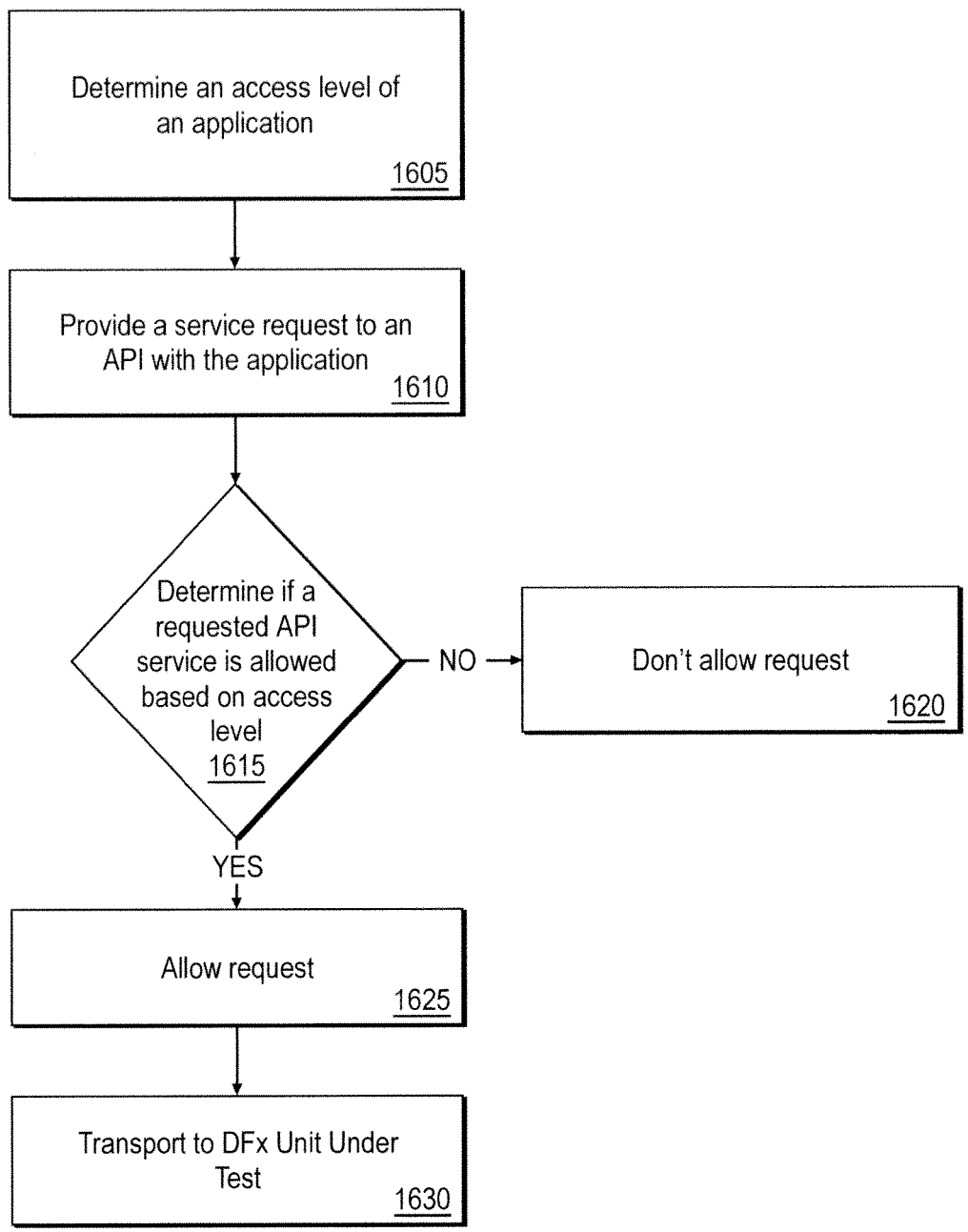
FIG. 16 illustrates an embodiment of a flow diagram for providing secure access in a test architecture.

Turning to FIG. 16, an embodiment of a flow diagram for providing secure access in a test architecture is illustrated. In flow 1605, an access level of an application is determined. In one embodiment, any known authentication process is utilized to associate the application with an access level for a test architecture. In another example, a passcode verification process, as described above is utilized to determine the access level of the application. Note that such determination may be made at the outset of executing the application (a general authentication for the program at its beginning) or may be made upon a specific request.

In flow 1610, a service request is provided by the application to an abstraction layer API. Here, a service request to an API is purely illustrative, as the request may include any service request or attempted access to DFx features. Regardless of the type or format of the request, in flow 1615 it's determined if the requested service is allowed based on the determined access level. In this scenario, certain services, algorithms, protocols, DFx features, etc. are predefined as allowable or restricted according to defined security access levels. Therefore, if the request is associate with an access level of the application (or a level with more access), then the request is allowed in flow 1625 and transported (if part of the service) to a DFx unit under test in flow 1630. In contrast, if the request is not within the application's access level, it is not allowed in flow 1620.

Embodiments of Physical Access to a Validation Architecture

Figure 17:
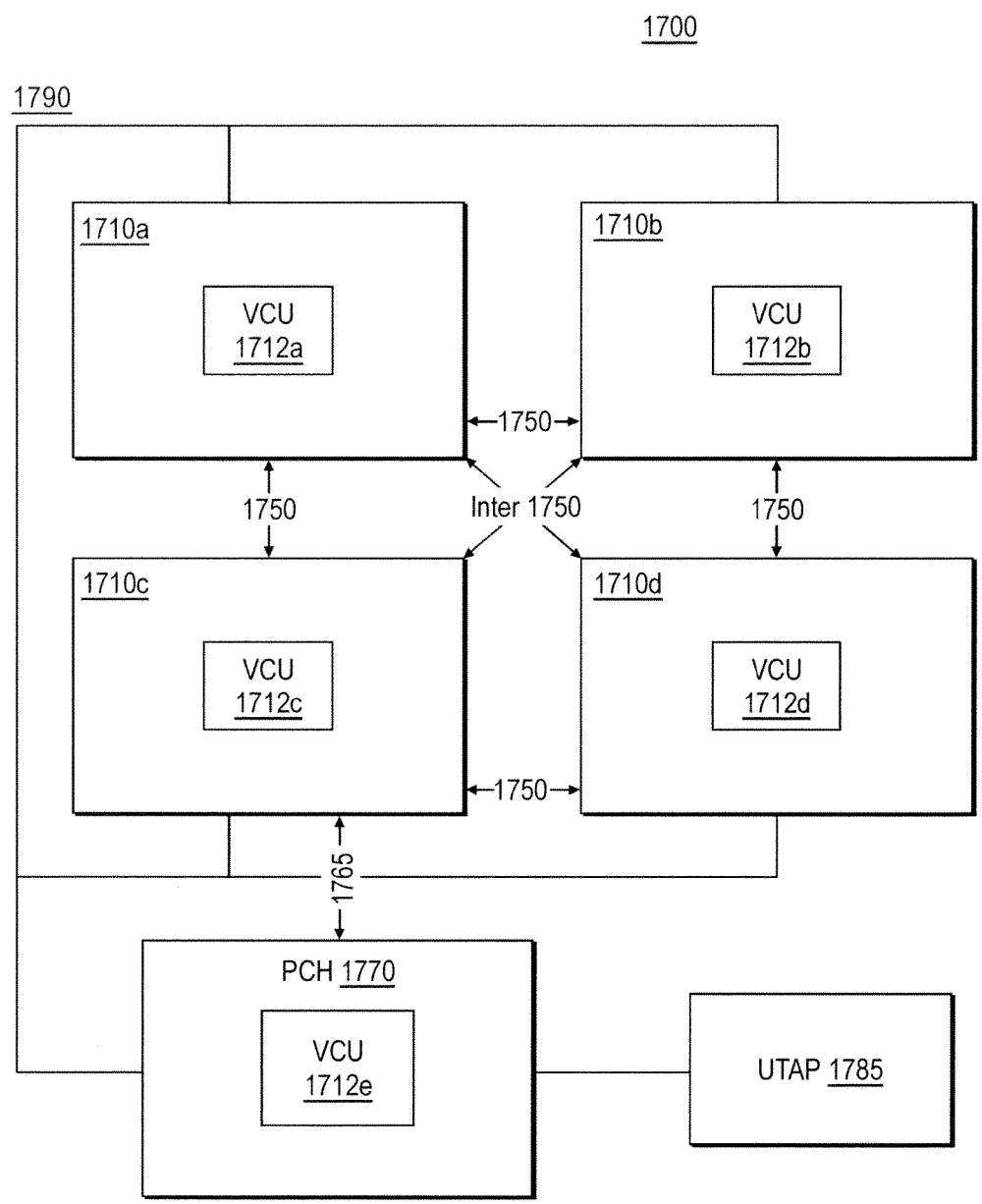
FIG. 17 illustrates an embodiment of a Universal Test Access Port (UTAP) for a test architecture in a platform is illustrated.

Previously, access to hardware test features was distributed through multiple disjoint, unconnected ports spread all over a computer platform. This made the connections to test a platform both cumbersome and expensive (different ports and tools to connect to those ports). Therefore, in one embodiment, a universal test access port (UTAP) is provided to replace multiple platform test interfaces. Referring to FIG. 17, an embodiment of a UTAP for a test architecture in a platform is illustrated.

Processors 1710*a-d* include any known processor coupled together by interconnect 1750, such as a Quickpath Interconnect, while PCH 1770 is coupled to processor 1710*c* though interconnect 1765, such as a direct media interface (DMI). As shown VCUs 1712*a-e* are able to communicate on interconnect 1790, such as a test interconnect or other known interface. But as stated above, in another embodiment, VCUs are able to communicate over interconnect 1750, 1765. Consequently, in this scenario, VCUs 1712a-e are adapted to communicate with each other, which enables access to platform 1700s VCU test features through a single, unified port, such as UTAP 1785. Here, VCUs 1712a-e are able to interact cooperatively. Or at the least, they are able to route messages from UTAP 1785 to the appropriate, intended VCU.

In one embodiment, UTAP 1785 includes a bi-directional port to extract debug information (from memory associated with the processor or back from VCUs) and to communicate with VCUs 1712a-e. As one example, UTAP 1785 includes a dedicated test port. In another embodiment, UTAP 1785 piggy-backs off another interface, such as an existing interface (e.g. a Universal Serial Bus (USB) interface, a Serial Advanced Technology Attachment (SATA) interface, or other known interface) or a future interface that is doubly utilized.

Note that the topology depicted is purely illustrative. Any number of processors may be included. And a PCH is does not have to be included. In addition, UTAP 1785 may include a physical port that is to couple to an external device, such as a console, computer, or tester. As another example, UTAP represents a network interface device (e.g. a NIC) or controller to communicate with a host or remote system (remote access is described in more detail below). Here, the controller may include a baseboard management controller (an embedded microcontroller embedded on a motherboard, which may report system parameters (e.g. temperature, fan speeds, power status, etc.) and may also facilitate remote communication with platform 1700.

Providing a universal test port potentially simplifies (both in expense and complexity) platform testing. However, current testing sites for individual parts, such as processors, also include inefficiencies. For example, processors have typically included test and validation pins on their "bottom-side," which are often pin limited, resulting in a larger package substrate and greater cost. To reduce such cost, customers are increasingly leaving out test and debug hooks. And as a result, when a customer is not able to debug a part it may become an erroneous return to the manufacturer.

Therefore, in one embodiment, unpopulated areas on a top surface of an integrated circuit (IC) package substrate (e.g. processors, controller hubs, etc.), such as on the substrate's perimeter, are utilized to place some or all of Test and/or Validation-use pins. As an example, these pins are etched into the package substrate's outer metal layer and exposed by the solder resist.

Figure 18:
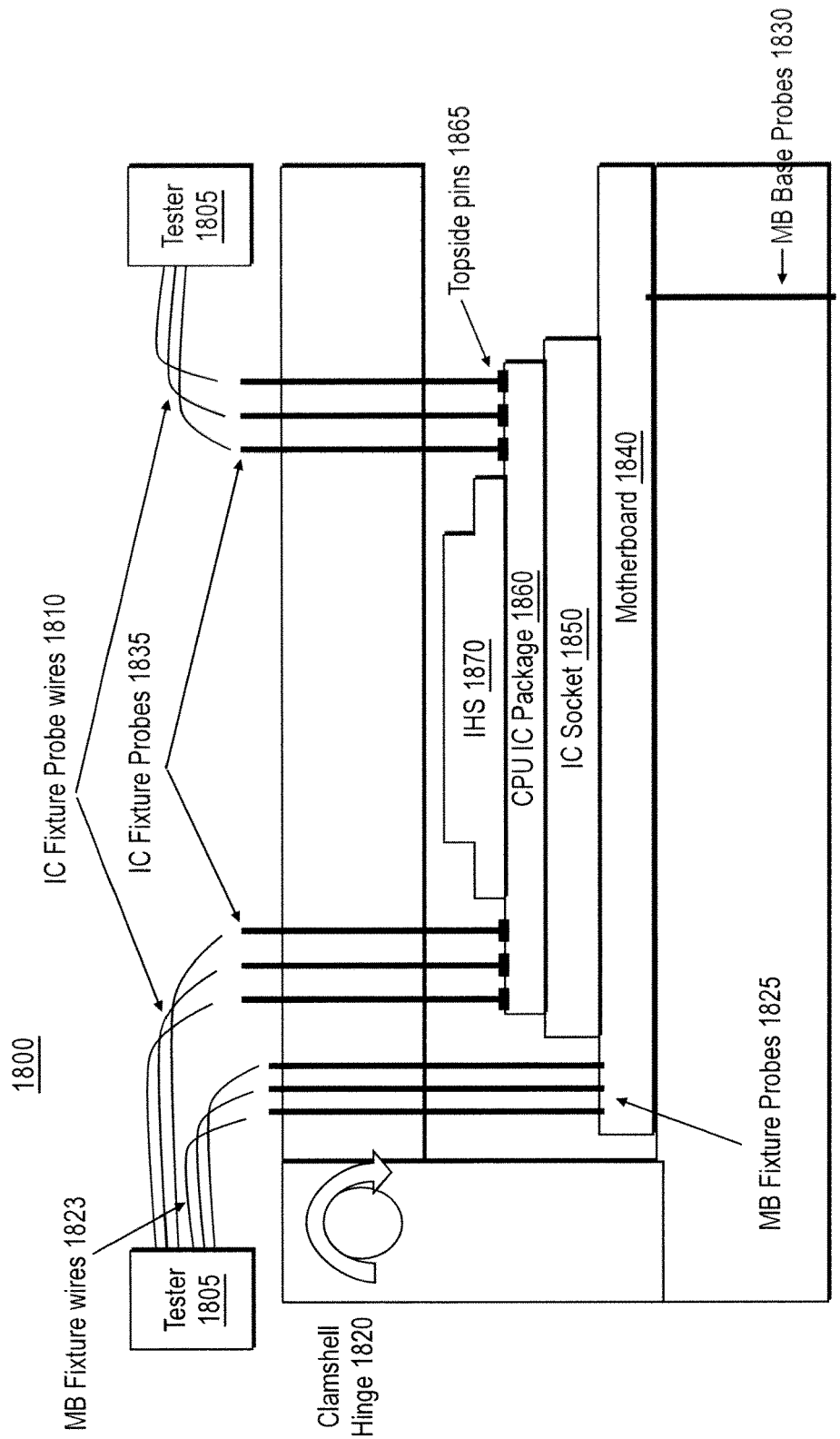
FIG. 18 illustrates an embodiment of an integrated circuit package in an exemplary high volume manufacturing connection mechanism.

Turning to FIG. 18 an embodiment of an integrated circuit package in an exemplary high volume manufacturing connection mechanism is illustrated. In this example, the IC includes CPU package 1860, which includes topside test and debug pins 1865. These pins are capable of being connected with in a variety of ways depending on the associated usage case. In a validation or troubleshooting usage case, they may be accessed using a compression-style connector mechanism, among other possibilities, which may include alignment features that align the connector directly to the package substrate; therefore gaining the best possible tolerances and driving the pin feature sizes and connecting system as small as possible. Note that these features often include compatible, reciprocating features in socket 1850 to enable a topside connector to make contact with a substrate of IC 1860.

The connection scenario illustrated, such as an HVM connection scenario, includes a clamshell hinge fixture 1820 to connect IC fixture probes 1835, such as pogo pin-type connections, to topside pins 1865. And IC fixture probe wires 1810 connect fixture probes 1835 to a console/tester 1805. As a result claim shell hinge 1820 allows for the connection mechanism to be opened, a new part to be inserted, and with the closing of hinge 1820 the connection between tester 1805 and topside test/debug pins 1865 is made. In various High Volume Manufacturing test usage cases, where the rate of interconnection to these top-of-package pins is expected to maintain minimum acceptable "beat rates," the method of connection would tend to be using a type of automated and/or high efficiency mechanisms as illustrated in FIG. 18.

Also illustrated is similar connection with motherboard 1840, where motherboard fixture wires 1823 connect tester 1805 t MB fixture probes 1825. Additionally, a base probe 1830 is also illustrated to touch a base of motherboard 1840. Note that the example of a clamshell hinge 1820 is purely illustrative, and any known connection scenario for probes, testers, sockets, HVM tools etc., may be utilized. Furthermore, similar mechanisms may be utilized for other ICs, such as a controller hub or peripheral device.

Figure 19:
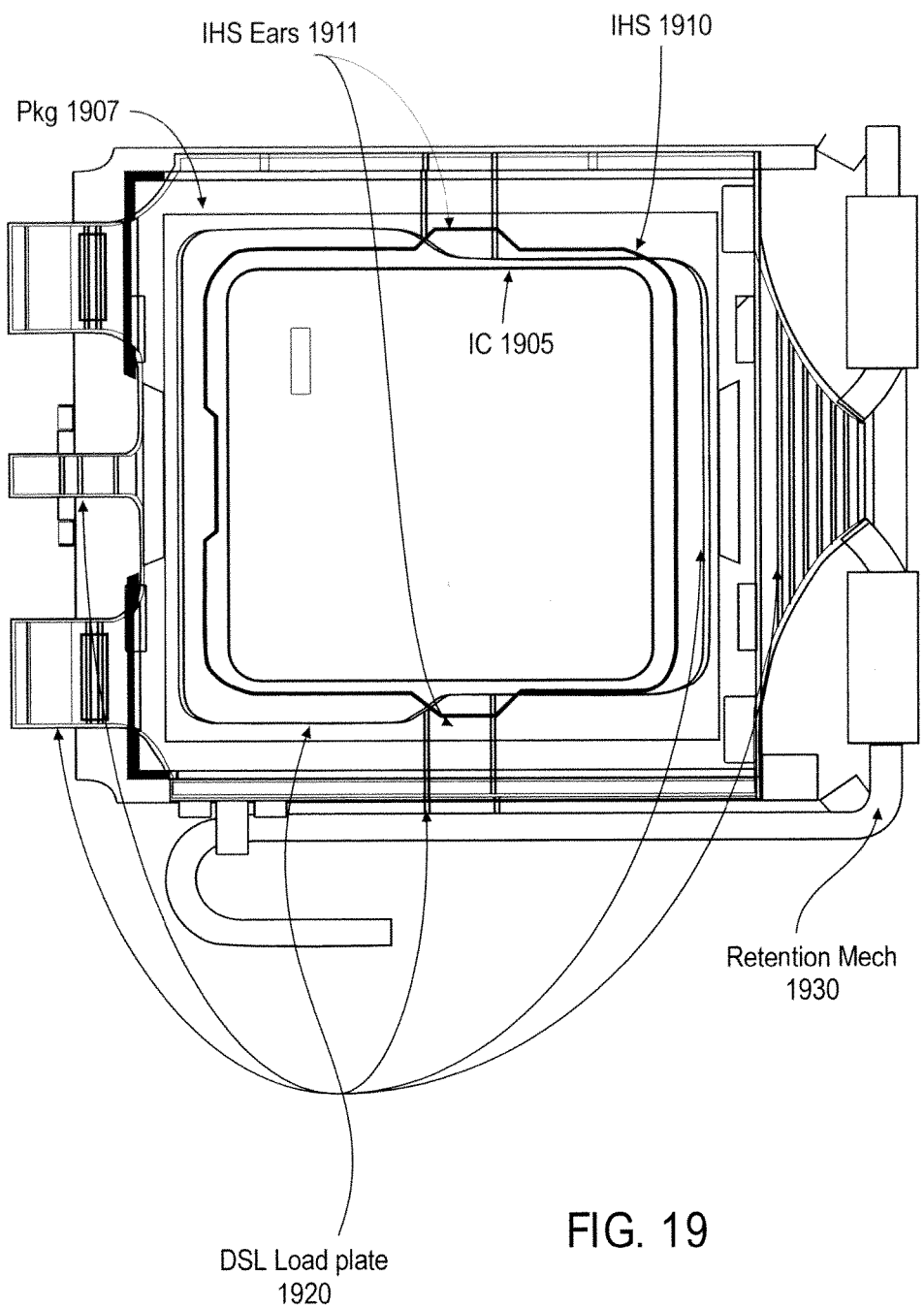
FIG. 19 illustrates an embodiment of a heat spreader with a discreet loading feature to support topside test pins and probing.

FIG. 18 also depicts integrated heat spreader (IHS) 1870, which in one embodiment, is designed to allow space for topside pins 1865 and connection thereto with fixture probes 1835. Turning to FIG. 19, an embodiment of a heat spreader with a discreet loading feature to support topside test pins and probing is illustrated. Here, integrated circuit 1905 on package 1907 associated with IHS 1910. In one embodiment, IHS 1910 includes discreet protruding "loading ears" 1911. In the illustration, loading ears 1911 provide socket actuation loading points for enabled socket loading mechanisms, such as a Direct Socket Loading (DSL) mechanism 1920. Utilizing such a design potentially results in less occupied topside area, which in turn allows more space for signal pins/pads for validation, as described above.

Outside of loading ears 1911, the perimeter of IHS 1910 may have a smaller continuous or discontinuous step along the edge of IHS 1910. As another alternative, the edge does not have any step. When ears 1911 are loaded, as shown, package 1907 is pressed onto the socket, actuating the socket and fording electrical connection between the socket and the device package. Note the number of ears (illustrated as two but not limited thereto) depends on a number of loading points for a particular application. Moreover, ears 1911 are located below (e.g. immediately below) a given application's loading points and are not required to be in the middle of IHS 1910. Yet, often the location of ears 1911 will typically (not always) be such that the forces applied by the loading mechanism on IHS 1910 results in an actuation force sufficient enough to close the IHS 1910/package 1907 center. In one embodiment, loading ears 1910 have a certain length to cover a complete loading zone of a loading mechanism. For example, the proposed IHS ears are in a range of 1 mm to 50 mm long to cover the load length of DSL load plate 1920. Note that during IHS 1910 assembly, IHS sealant may be put underneath ears 1911 to transfer the load force to package 1907 without bending ears 1911.

As a result, a previous, typical IHS having a loading step around 90% of a perimeter to ensure enough distributed load actuates the socket to force electrical connection. But by providing loading ears, as discussed above, the same loading process may be achieved with a reduced edge step, enabling more space on a topside of an IC for test/debug pinout and probing. In addition, to facilitate more space IHS 1910 may have a selective shaped shelf with discreet loading ears 1911 located where the loading is mostly applied to IHS 1910. For example, DSL load plate 1920 contacts a small portion of the step for IHS 1910. So ears 1911 are strategically placed where DSL plate 1920 places the load. Consequently, with the newly freed space, the new topside test pins may be included without growing a package size or decreasing IHS 1910's thermal dissipation area.

Figure 20:
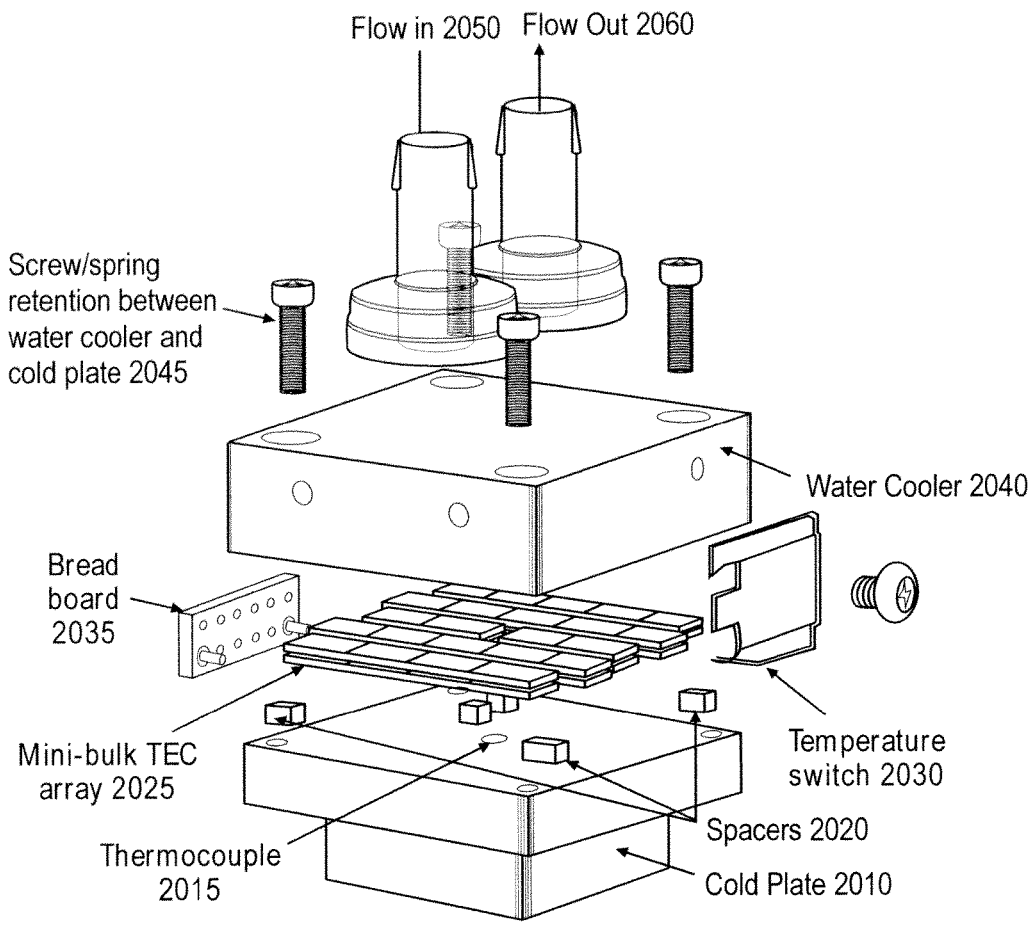
FIG. 20 illustrates an embodiment of an exploded view of a small form factor thermal tool (SFFTT) design to provide thermal margining.

In a related matter to heat dissipation, current thermal margining tool designs are extremely large, which cause larger real estate usage and reduced signal integrity margins. Therefore, referring to FIG. 20, an embodiment of an exploded view of a small form factor thermal tool (SFFTT) design to provide thermal margining is depicted. Note such margining may be considered, in some embodiments, as a DFx feature. Here, SFFTT 2000 includes one or more features including: a custom cold plate 2010 soldered to the bottom of the mini-bulk thermo-electric cooler (TEC) array 2025; a water cooler 2040 with micro-channel cooling technology that is attached to the top of the mini-bulk TEC array 2025 through liquid metal thermal interface material (e.g. a Ga—Sn liquid metal material); a unique channel design of water cooler 2040's cover to provide uniform water flow distribution; tubing for inlet and outlet (flow in 2050 and flow out 2060) of water at the center of the device; a wire harness assembly to a controller; a T-type thermocouple embedded in a center of cold plate 2010 to provide temperature feedback to a controller; spacers 2020 between water cooler 2040 and cold plate 2010 to address TEC cracking issues; TEC 2025 cable management using bread board 2035 to relieve wire stress; and a temperature switch.

Such features provide potential advantages for an SFFTT. For example, a water cooler 2040 with micro-channel cooling technology is potentially more efficient than a diamond-fin technology design. And placement of the inlet and outlet (250, 260) at the center of SFFTT 2000 along with unique channel design of the water cooler cover allows the cold flow to enter the water block from the center, while the heated water travels to the sides of the cooler; this distance is only half of the channel length in comparison to other diamond fine style designs. As a result, the coldest region is at the center where the heat concentration is typically the highest due to heat generated by the TEC 2025 and the silicon under test. Eventually, the temperature difference across the water cooler is potentially reduced by as much as 3 degrees C. and the temperature is more uniformly distributed, which cooler results in improved reliability of TECs 2025. As another example, attachment of cold plate 2010 to mini bulk TEC array 2025 potentially reduces a layer(s) of thermal resistance. Moreover, spacers 2020 between water cooler 2040 and cold plate 2010 provides a cushioning mechanism to prevent TEC 2025's cracking issues faced in a Bulk TEC case. And cable management using breadboard 2035 potentially relieve wire stress, as well as reduces TEC lead failure.

To provide further discussion, some illustrative specifications of features described above are discussed herein. As a first example, mini-bulk TEC array 2025 includes an area up to 39 mm by 39 mm with a maximum dissipated temperature of 75 C and a footprint of up to 15 cm^2. Additionally, any number of TECs may be connected in array 2025. As an illustrative embodiment, two groups of 11 TECs are connected in series and two groups of 11 TECs are connected in parallel. In addition, a micro-channel fin design for water cooler 2040 provides vertical (or horizontal) cooling channels, instead of a diamond fin's circular cooling pattern. And the channels/fins may be any size. For example, the fins may be 2 mm in height, 0.3 mm in width, and spaced 0.3 mm apart. An exemplary simulation of different designs for water cooler 2040 is provided below in Table A.

TABLE A

| Water Cooler Simulated Performance Summary | | | | | |
| --- | --- | --- | --- | --- | --- |
| SFF LC-TT w/New Water Cooler Design (Vista Ridge) | Fin Thickness/ Channel Width (mm) | TDP (W) | Housing Material | Cooler Size (mm × mm) | Cooler Height (mm) | Simulations Lowest Tcp (C.) |
| Microfin (high profile) | 0.25/0.3 | 50 | Brass | 32 × 32 | 10 | −12.3 |
| Microfin (high profile) | 0.25/0.3 | 50 | Acrylic | 32 × 32 | 10 | −11.2 |
| Microfin (low-profile) | 0.25/0.3 | 50 | Brass | 32 × 32 | 7 | −10.4 |
| Microfin (low-profile) | 0.25/0.3 | 50 | Acrylic | 32 × 32 | 7 | −9.5 |

Similar simulation shows a much improved velocity distribution and temperature distribution with micro-channel water cooler technology. As a result of the improvements, the SFFTT is potentially reduced in size by as much as 40%-50% in comparison to previous thermal margining devices, while still providing similar temperature margining (e.g. 5 C-100 C). Furthermore, the reduction in the form factor also potentially saves real estate on a board and improves signal integrity (SI) margins by enabling a chip to be placed closer to a next chip. Improvement in SI margins also drives a trend of all market segments towards miniaturization of products. Unique channel design on a water cooler cover also potentially provides uniform water flow distribution that results in improved TEC reliability. Moreover, fault detection may be accelerated by isolating faults and reducing escapes as part of Post-Silicon debug/validation activities of manufactures and vendors. And enabling temperature margining capability for vendors may provide a manufacture with a competitive edge in performance. It's also worth noting that validation findings of vendors may also help manufacturers become more efficient in electrical validation, which potentially enables delivery of more end-user friendly products.

Embodiments of Remote Access to a Validation Architecture

Previously, manufactures spent vast amounts of resources (time, personnel, and money) to aid vendors in their debug efforts. In fact, often manufactures/designers would send validation engineers to vendor sites, when the vendors were unable to perform their own test and debug or encountered problems therewith. Unfortunately, as the complexity of parts and platforms grow, this process is becoming more difficult for vendors and more cumbersome for manufactures. Consequently, in one embodiment, a validation architecture enables remote access to aid in a test, validation, and/or debug process.

Figure 21:
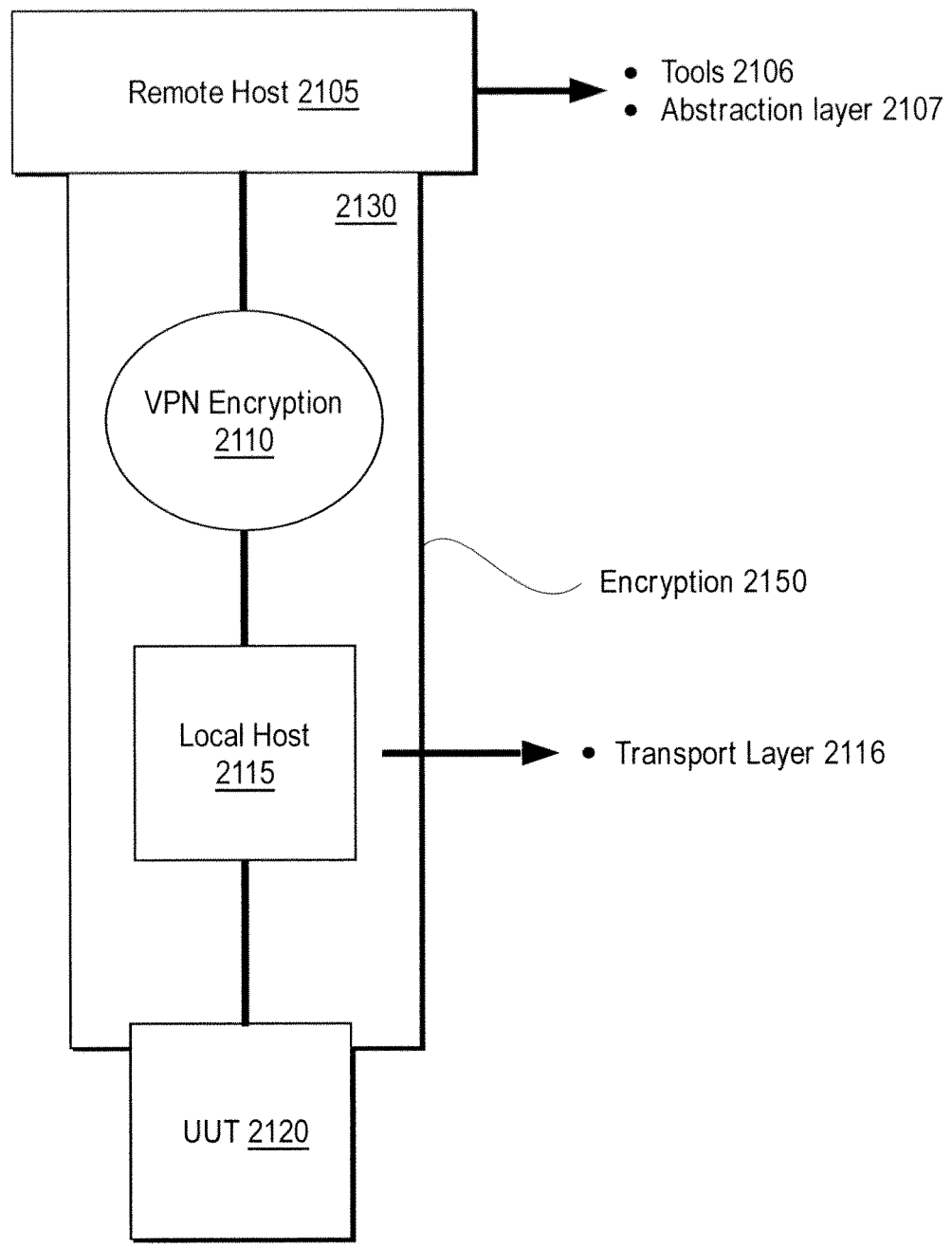
FIG. 21 illustrates an embodiment of remote access to a unit under test.

Turning to FIG. 21, an embodiment of remote access to a unit under test is illustrated. As stated above, layers of a test architecture stack may be implemented across machines (and networks). Here, a remote host 2105 includes/implements tools 2106 (an application layer having test, validation, and/or debug tools) and abstraction layer 2107, as described above. Communication from layers 2106, 2017 are providing over interface 2130, which may include any known interface, such as a remote interface, a network interface, a peripheral interface, etc. In one embodiment, such communication is encrypted according to any known encryption algorithm 2150. Additionally, in another embodiment, VPN encryption 2110 is utilized in the transport. In this scenario, local host 2115 (i.e. the host coupled in any manner to remote host 2105) is to implement transport layer 2116 for adapting transport agnostic layers 2106, 2107 for transport to unit under test (UUT) 2120. Therefore, any of the testing, debug, validation, and security operations described above may be implemented from a remote host to interface with a unit under test.

Figure 22:
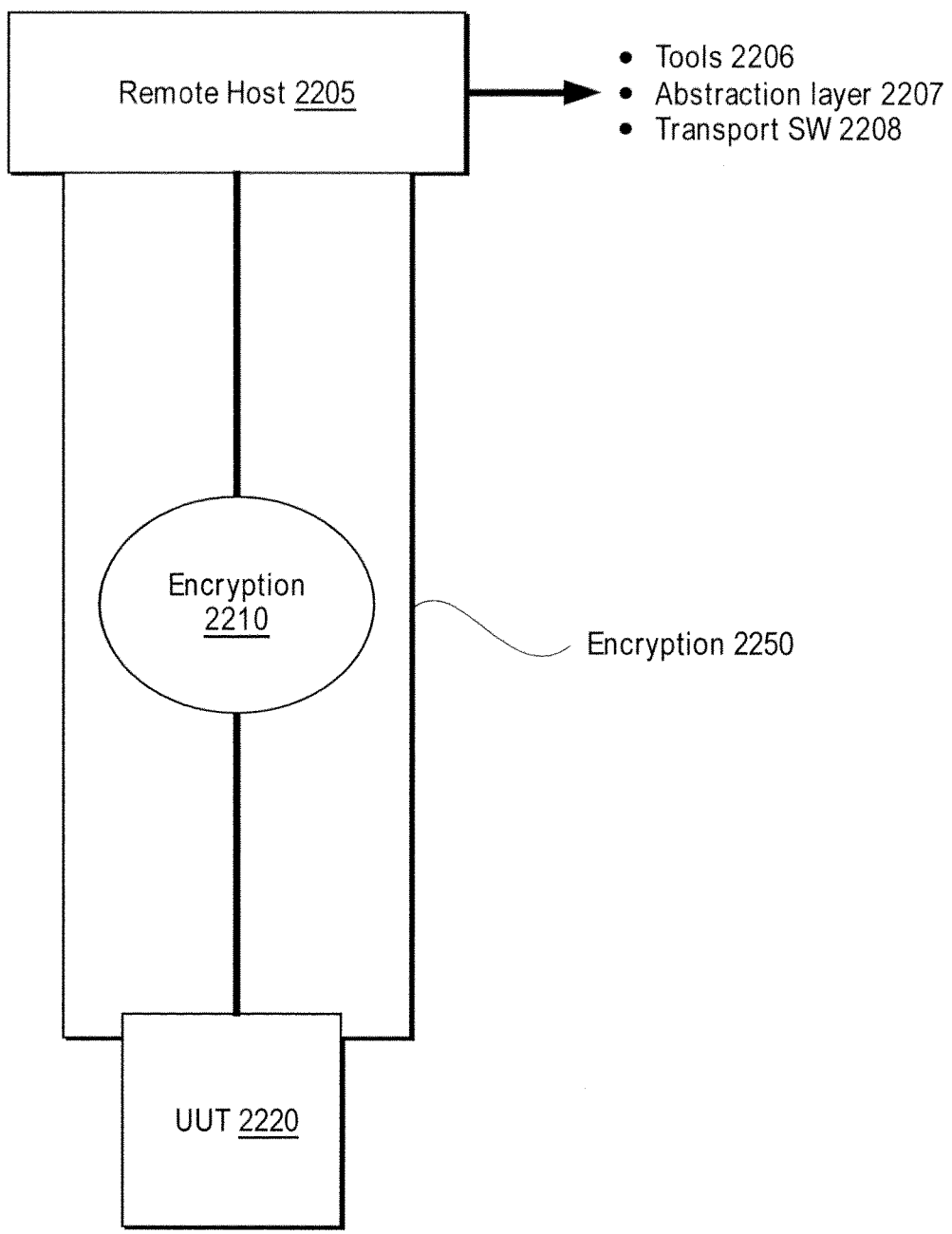
FIG. 22 illustrates an embodiment of another embodiment of remote access to a unit under test.

Referring quickly to FIG. 22, another embodiment of remote access to a unit under test is illustrated. Here, the remote host 2205 includes three layers (2206, 2207, and 2208) and has direct communication over an encrypted channel with unit under test (UUT) 2220. As the layout difference illustrates, any coupling or layout may be implemented to interface with a unit under test remotely. Also any authentication process may be utilized to setup the channel. And a security protocol (similar to those described above) could be utilized to verify different levels of access. As a result, a vendor or manufacturer may be able to remotely test, validate, or debug a device without having to physically interface with the unit. From above, it can be seen that the time and expense associated with test/debug is potentially drastically reduced by allowing validation engineers to validate products remotely from their original location instead of having to be physically present at vendor sites.

Embodiments of Trace Capture Information Management

As discussed above, such as in the Embodiments of Test, Validation, and Debug Hooks section, an ODLA on a processor, controller hub, or other device, in some embodiments, is able to capture on-die and/or interface information, such as trace information. And it may be delivered in any number of manners, such as utilizing memory as a trace buffer. Or as described in more detail below logic may provide such data through an interface, such as a side-band communication bus. Then, the information may be provided to tools for management (formatting, manipulation, interpretation, debugging, etc.).

Figure 23:
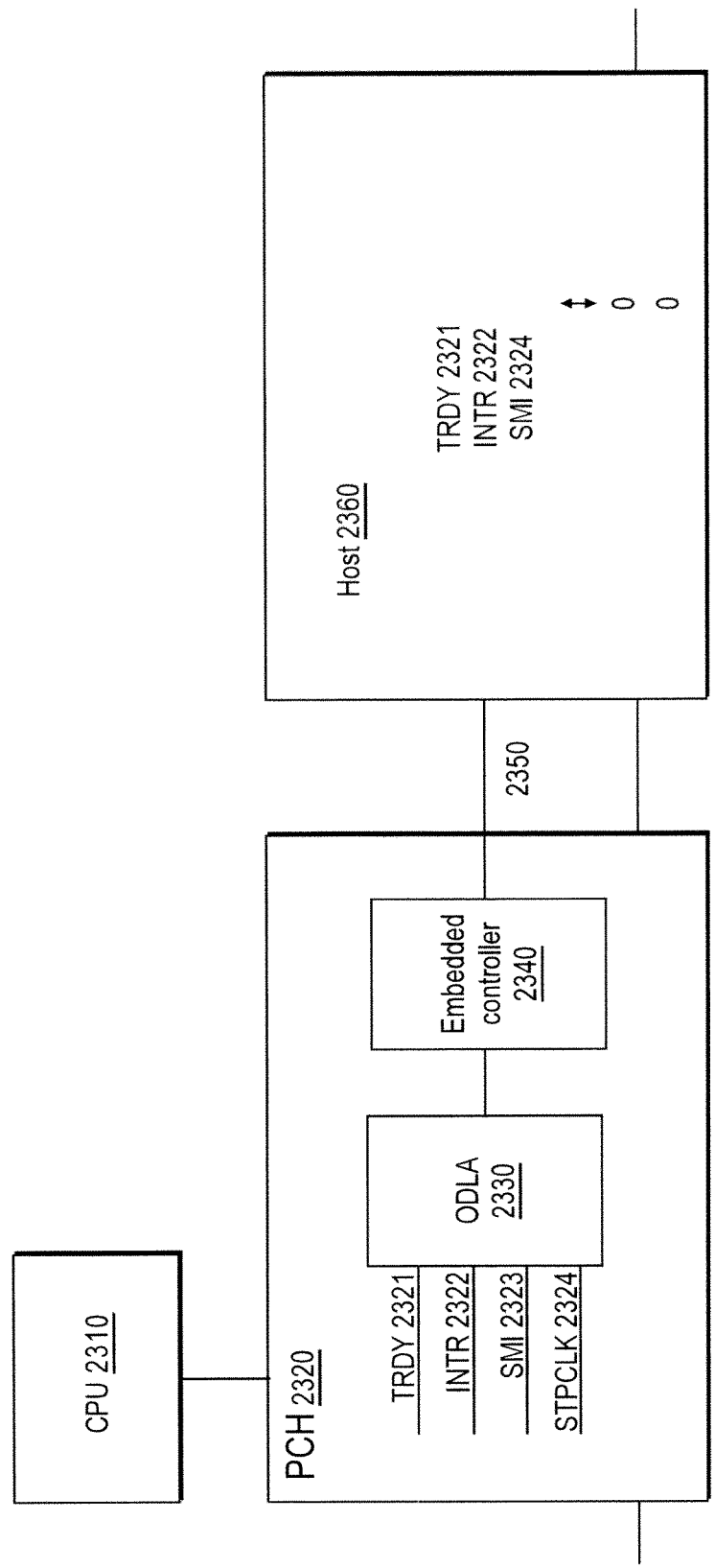
FIG. 23 illustrates an embodiment of logic to provide internally observed trace information over a sideband bus.

Also mentioned above, it the complexity and cost of utilizing external analyzers to capture and analyze parts. For example, a protocol analyzer for a complex interface, such as a PCIe interface may cost upwards of 50,000 dollars. And as legacy signals become more and more integrated, such as part of in-band messaging via a high speed serial interface, the information is not readily available on a mother board. As a result, FIG. 23, illustrates an embodiment of logic to provide trace information over a sideband bus, such as JTAG or SMBus, to a host system. Examples of legacy in-band signals to capture include: TRDY 2321, INTR 2322, SMI 2323, and STPCLK 2324. Here, ODLA 2330 in PCH 2320 captures traces of the aforementioned signals; note this may be in response to any event, such as toggling a pin, setting a breakpoint event, at direction of host system 2360 or embedded controller 2340 (e.g. a VCU implementing an abstraction layer). Controller 2340 collects data for the signals and provides it to host system 2360 over side-band bus 2350. As an example, the format of this data includes: an indication if a corresponding signal is stuck high, stuck low, toggling, a direction of toggle, or a rate of toggling. Here, with the embedded controller 2340 to process the data and ability of ODLA 2340 to select different internal signal sets to be observed, the debug capability can be updated without any change in hardware.

Figure 24:
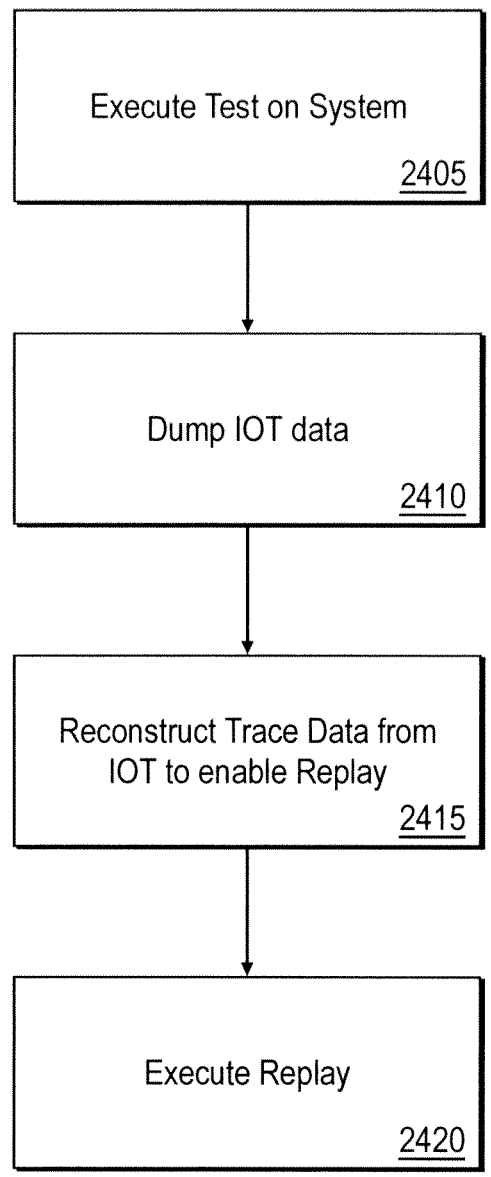
FIG. 24 illustrates an embodiment of flow diagram for a method of managing internal observation trace (IOT) data.

Turning to FIG. 24, an embodiment of a flow diagram for a method of managing internal observation trace (IOT) data is depicted. In flow 2405, a test is executed on a system. For example, a test as described above is run on an unit under test. And IOT data is obtained from logic, such as an ODLA (also referred to as an On Chip Logic Analyzer OCLA). Note that the IOT data may include multiple streams/sources (e.g. memory, I/O, on-core interfaces, etc).

In flow 2410, IOT data is dumped. For example, a memory associated with the unit under test is utilized as a trace buffer for IOT data. Yet, any known interface may be utilized to dump/provide data to a system, such as a console or host system, which is to handle/interpret the IOT data.

Figure 25:
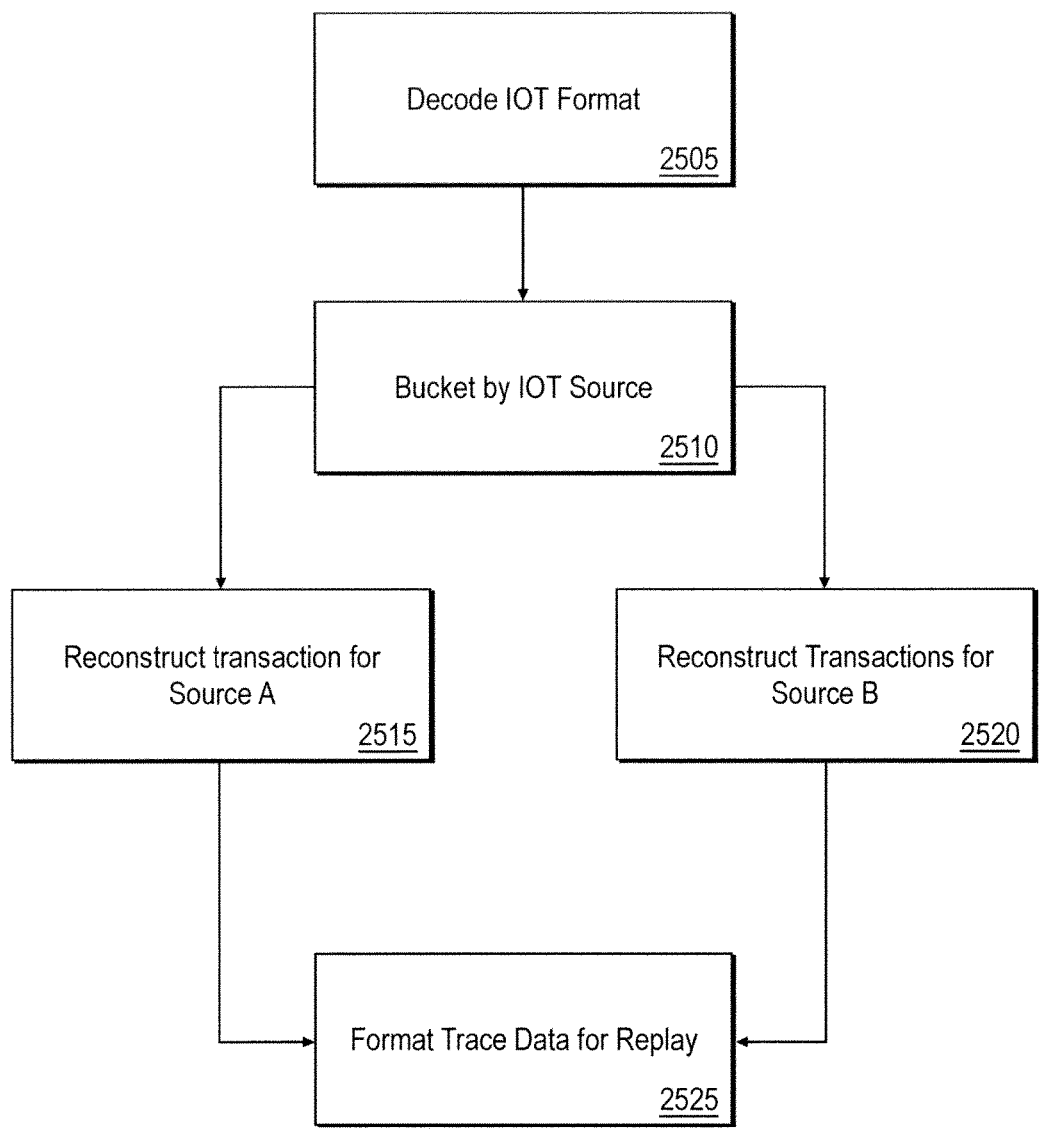
FIG. 25 illustrates an embodiment of a flow diagram for reconstructing traces from IOT data.

In flow 2415, trace data is reconstructed from the IOT data to enable replay. Any known method of reconstructing traces and/or formatting trace data may be utilized. To provide an illustrative example quick reference is made to FIG. 25. Here, the format of IOT data is decoded. In one scenario, the IOT data includes multiple streams/sources with a specific, predefined format. So, in flow 2505 the IOT data is decoded according to such as format. As an example, the sources are identified for the IOT data. And in flow 2510, the IOT data is separated, grouped, and/or bucketed by source.

A module (service) for each source, such as a memory module for memory source IOT data; internal processor module for processor trace source IOT data; a Quickpath module for Quickpath interface IOT data; an on-core module for ring traffic of an on-core interconnect, etc., reconstructs transactions for each corresponding source in flows 2515, 2520. Moreover, the modules, in one embodiment, reformat the reconstructed trace data specifically for replay in flow 2525. Returning to FIG. 24, replay of the formatted, reconstructed trace data is replayed. As a result, the replay is able to provide insight into the operation of a unit under test for validation and debug.

Consequently, debug time and cost are potentially reduced, which increases the product development cycle. And the replay allows software mechanisms to enable the reproduction of bugs in an emulation environment for products including the same or similar DFx methodologies, such as the test architecture described herein. Reproducing such bugs in an emulation environment provides full visibility to all system behavior within the system under test, enabling quick debug. This potentially helps resolve both logic and circuit marginality bugs. In addition, similar apparatus' and methods may be utilized in developing test content for high volume manufacturing; this potentially provides quick and efficient test content for high volume manufacturing, which saves cost by improving confidence in product stability and assisting in part binning.

Figure 26:
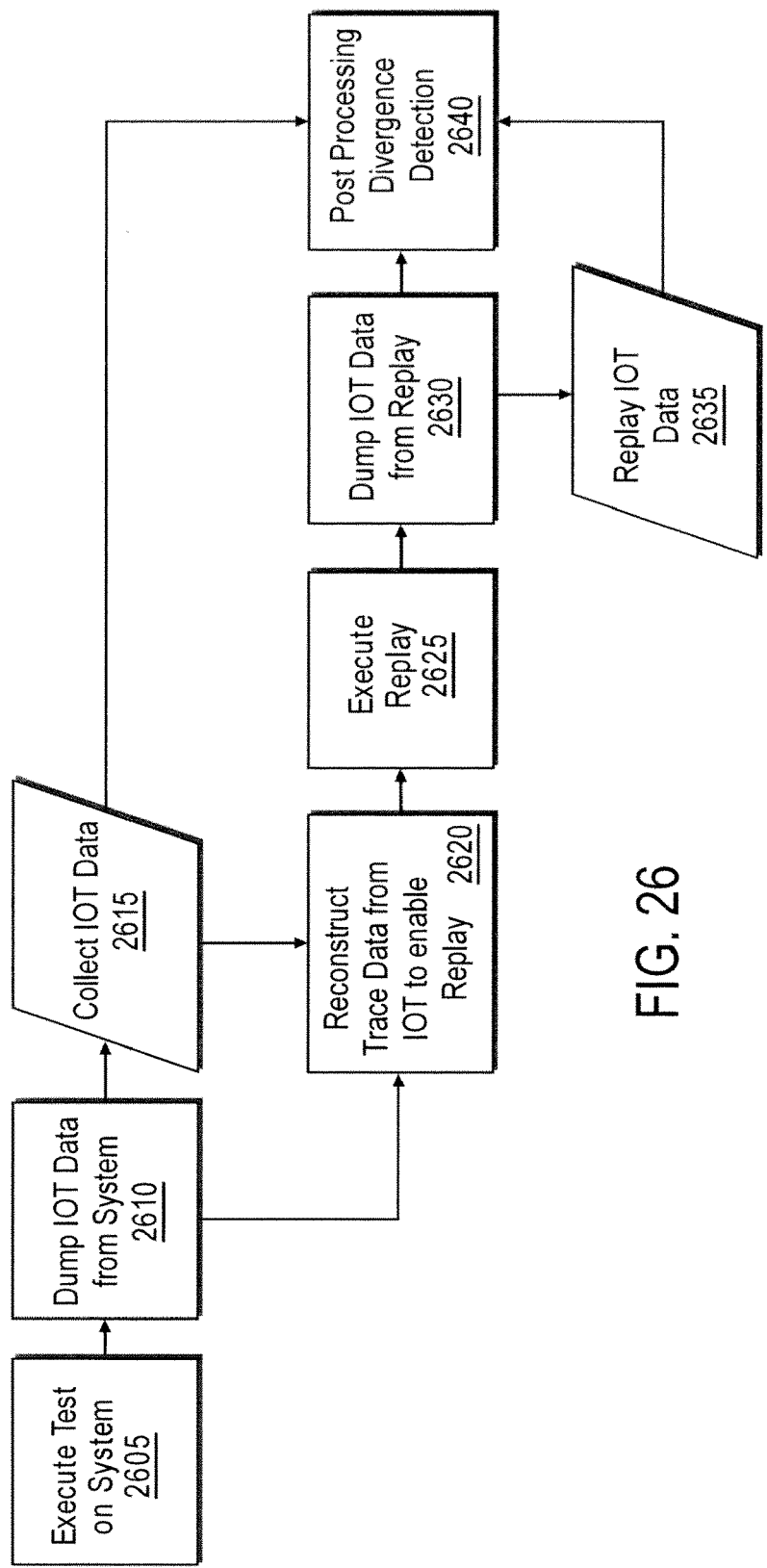
FIG. 26 illustrates an embodiment of a flow diagram for a method of performing post processing divergence detection.

Turning to FIG. 26, an embodiment of a flow diagram for a method of performing post processing divergence detection is illustrated. As stated above, when a test is executed on a system under testing (flow 2605), data can be collected and used to replay the exact same test conditions in an Emulation/Simulation environment (flows 2610-2625, which operate in a similar method to FIGS. 24-25 as describe above). From this process, validation is able to detect differences between the test performed on hardware and in the software model; these differences are referred to as divergences. Post processing divergence detection leverages DFx hardware features, such as IOT capture with an OCLA, to save system state. When a test is replayed, the data stored in IOT in Emulation (Replay IOT data 2635) may be processed after Replay executes and compared to the data stored in IOT collected from the system under testing (Collected IOT Data 2615) to obtain post processing divergence detection results 2640 (i.e. the differences between data 2615 and replay data 2635). Execution time during Replay is costly because it requires expensive, special purpose hardware. So computing the divergence during such Replay potentially wastes costly execution time. So in one embodiment, the saved system state to an internal location, such as system memory, allows the ability to process the data separately on less expensive hardware after the Replay stage completes.

Figure 27:
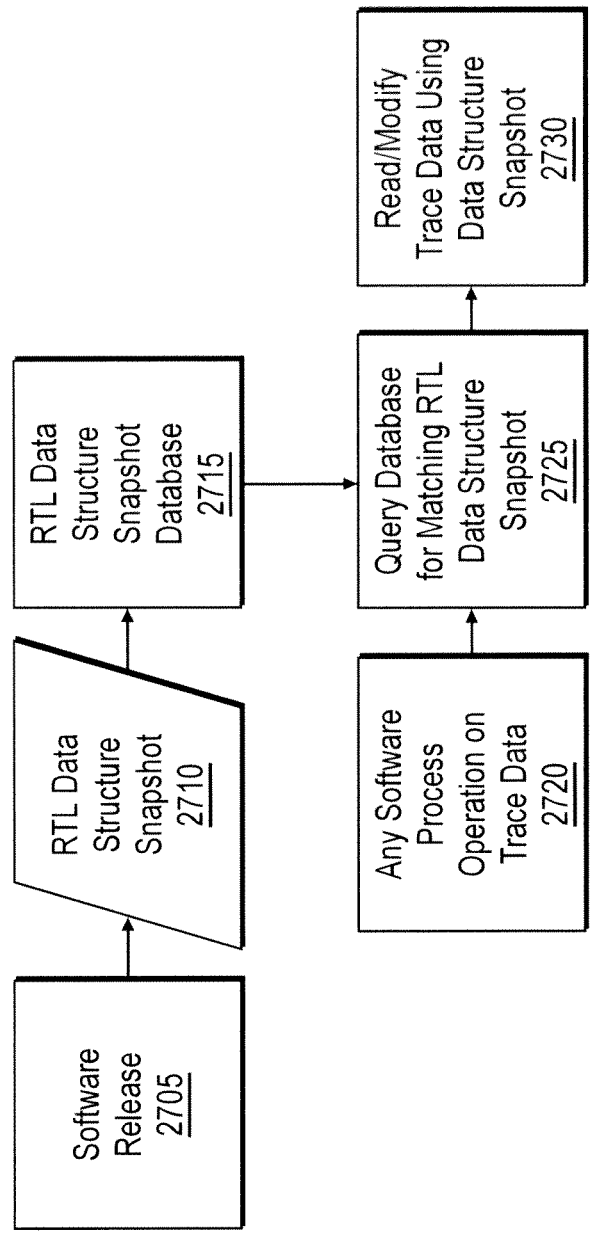
FIG. 27 illustrates an embodiment of a flow diagram for enabling RTL data structures to be accessible to a high level language.

Referring next to FIG. 27, an embodiment of a flow diagram for enabling RTL data structures to be accessible to a high level language is illustrated. When trace data is collected from a system under test, certain data fields collected are usually analyzed, which may include modification from the trace. Unfortunately, RTL is ever changing, which results in software designed around RTL having to be constantly updated. Therefore, in one embodiment, when software is released (flow 2705), RTL models are scanned at the time of a software release (e.g. a snapshot of RTL data is taken in flow 2710). From the snapshot, RTL data types are recorded in a more general format, such as in XML. Here, an RTL data structure snapshot database is created from RTL snapshot data in flow 2715.

Once RTL data is stored (i.e. the database is created), software mechanisms/services to read, mask, and modify trace data packets based on the snapshot RTL data type definitions are provided. By simply selecting which snapshot to load based on which RTL model the trace originated from, other software is potentially insulated from inconsequential RTL changes. As an example, when software is to interpret or modify trace data from a test using that RTL model (flow 2720), it queries the database of RTL data structures (flow 2725) and uses that information to decode trace data (flow 2730). As a result, instead of relying on constant RTL models and changing software, a flexible and adaptable infrastructure (models of packet and signal formats) for RTL data structures is provided.

Embodiments of Power Validation

As logic increases and circuits become smaller, and issues related to circuits are growing sharply. And circuit bugs are escaping detection. Additionally, there are no good current characterization methods to make circuit failures more reproducible for non speed path issues. As a result, in one embodiment, a circuit marginality validation (CMV) methodology is utilized to find problems for non-speed paths, as well as potentially for speed paths. Major causes of circuit marginality include: on-die signal integrity (cross-coupling induced noise, droop-event induced noise); power delivery integrity (high dynamic current events often due to clock gating); clock domain crossing; and process, voltage, and temperature changes (Power state transitions, Silicon process variation).

Based on Platform Validation Management product analyses over the past several generations indications show that the power (pwr) grid is the major contributor to circuit marginalities. Consequently, in one embodiment, an infrastructure for enabling spatial and temporal characterization, as well as debug, of a power grid relative to on-die events, including an ability to correlate test and system events with power grid performance is provided.

Figure 28:
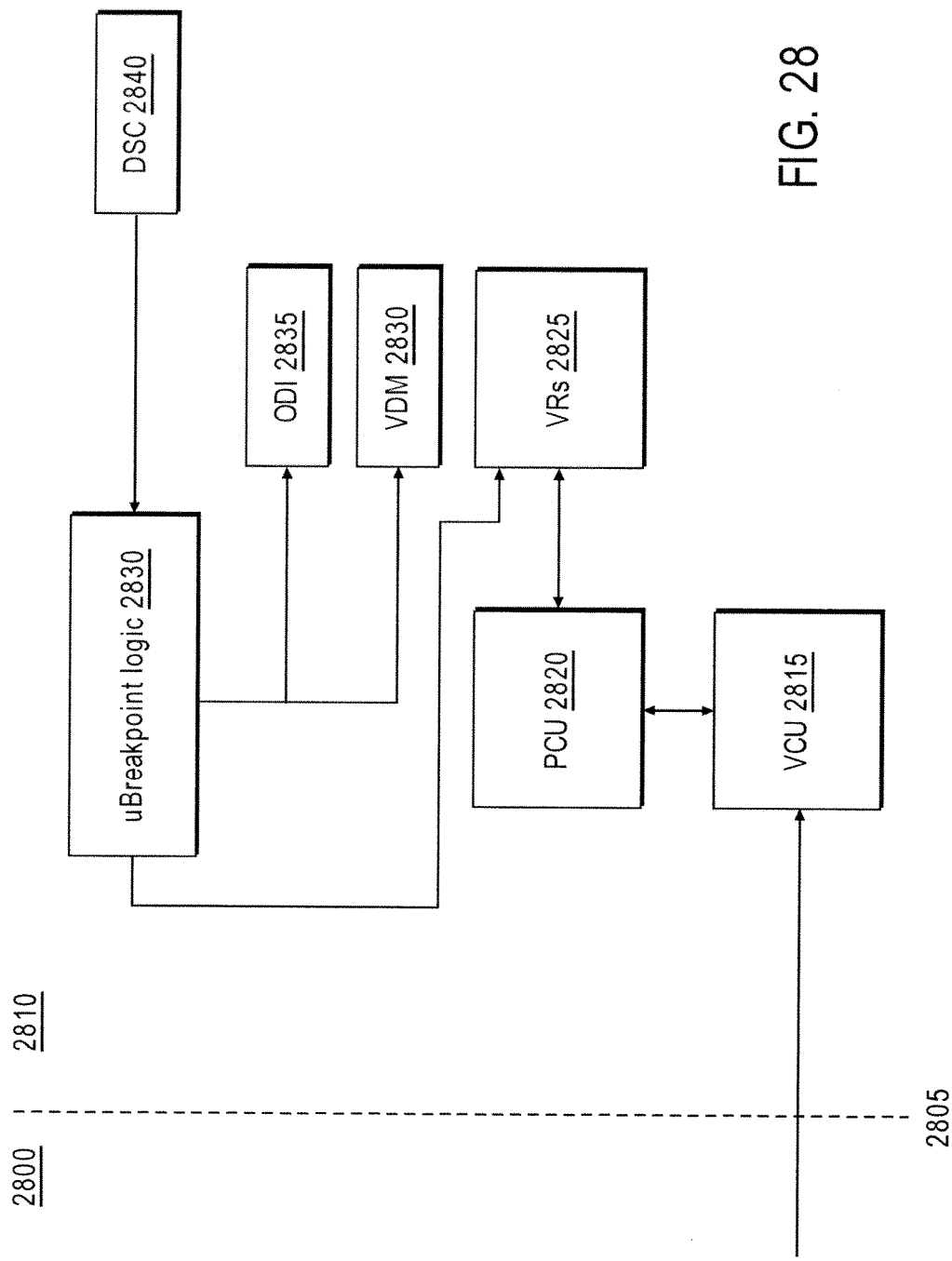
FIG. 28 illustrates an embodiment of an infrastructure for for enabling spatial and temporal characterization, as well as debug, of a power grid relative to on-die events, including an ability to correlate test and system events with power grid performance.

Turning to FIG. 28, an embodiment of one such infrastructure is provided. Here, a comprehensive, integrated (on-die) architecture which enables time-based and spatial control, as well as, observation of on-die voltage regulation events with an ability to correlate such events deterministically with test content as well as system events is provided. As illustrated, the architecture 2810 is to be interfaced with by host 2800 through an abstraction layer 2805 (as described above), which may be implemented by VCU 2815.

The components of architecture 2800 include: a high bandwith on-die voltage droop monitoring capability (VDM 2830) and droop injection mechanism (ODI 2835 (both of which, in one embodiment, are adapted to be configured temporally and spatially); a clock cycle specific test content synchronization infrastructure, a deterministic event triggering and clk cycle accurate time monitoring infrastructure (DSC 2840), which in one embodiment allows event time stamping and replay; a dynamic on-die voltage regulation state capture capability, such as an ODLA for VR state capture, with event correlation; a configurable hardware based payload modification mechanism (microbreakpoint logic 2830) which may be initiated on system events, testing events, and/or power state transitions in any given power domain or domains at the discretion of the user/host 2800.

A non-exhaustive list of examples regarding capabilities of the architecture include: Ability to correlate ODI/VDM/System (I/O or core) events with on die voltage regulation internals observation, such as snapshots of analog observation points via A/D samples and dynamic snapshots of state machine vents; initiate hardware based payload changes deterministically; synchronize ODI and/or VDM trigger events to internal VR events; break on internal VR events; capture timestamps of internal VR events; monitor delay between power management command issue and actual VR change; observer VDM/ODI change; correlate inbound current behavior to internal events, observe gear ration change and power distribution effects, and provide duty cycle detection interval calculations.

A few non-exhaustive examples of applications and modes of the architecture include: power grid characterization; system event based correlation; and power event based correlation; all of which are illustratively described below. For a power grid, characterization may be done in any number of ways, giving a user complete flexibility. In essence, the voltage monitoring circuits in this mode of operation are pre-configured to capture voltages over time. The voltages are measured by counting the oscillations of a ring oscillator during short time durations. Over the course of a test or other system activity, the highest peaks and lowest valleys within a given power domain locality are captured by comparing samples throughout the course of the characterization cycle. Here, characterization may be done while the system is quiescent, in a boot cycle, during a test, or during any number of system events. And characterization may also be done on any/all domains simultaneously.

For system event based correlation, utilizing a microbreakpoint infrastructure configured to synchronize the start of a test sequence (or a system event of interest) with the initiation of power grid sampling, elapsed time is captured to the point of failure or upon the occurrence of a particular system event such as a Cyclic Redundancy Check (CRC) failure (as an illustrative example). The test sequence may then be deterministically replayed to evaluate on die voltage regulation performance in a configurable manner; with the ability to look at any given clock cycle prior to, during, or after a given trigger event. Data collection of analog points and state data may be dynamically captured at a given instance in time or locality based on a trigger event of interest. Consequently, There's a diverse flexibility innate in the architecture, such that trigger events and actions may be provided by the power regulation blocks, power mgmt, or test/system specific events.

For power event based correlation, operation is similar to system event correlation. A microbreakpoint "like" infrastructure is integrated into the voltage regulation circuitry allowing the initiation of a number of system events with the sampling of the power grid via VDM 2830 and/or the injection of a droop event via ODI 2835. Trigger events in this mode are, in one embodiment, initiated on specific power events or states most typically.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, etc that are combined and/or configured to perform tasks. In another embodiment, logic refers to other devices, such as programmable logic devices or programmable logic arrays. In yet another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a tangible machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of tangible storage devices for holding non-tangible, propagated signals (e.g., carrier waves, infrared signals, digital signals); etc.

In addition, the embodiments of methods, hardware, software, firmware or code set forth above may be implemented by execution of a compiler stored on a machine readable medium or as part of executing code stored on a machine readable medium compiled by a compiler. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization. A compiler, in one embodiment, is to compile and/or optimize code to insert operations, calls, functions, instructions, etc. to perform the methods described herein.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. Such insertions, in one embodiment, occur during static and/or whole program compilation. In another embodiment, during dynamic compilation, compiler code or dynamic optimization code may insert such operations/calls, as well as optimize the code for execution during runtime. In one scenario, either hardware or software, such as a compiler program, may also perform dynamic profiling of program execution.

Reference throughout this specification to "one embodiment" or "an embodiment" means that a particular feature, structure, or characteristic described in connection with the embodiment is included in one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   at least one hardware testing hook integrated within a physical layer of a device to provide test information collected from the device to a software layer, the at least one hardware testing hook to provide access to circuit traces regardless of a small form factor of the circuit and obviating use of a probe, the test information to be used for testing, validation, or debug, and relating to test events;
   a power grid characterization circuit to provide temporally and spatially characterized power grid performance information correlated with the test events, the temporal characterization to occur while the device is quiescent, in a boot cycle, during a test, and during a system event, and the spatial characterization to occur in a plurality of power domains simultaneously; and a validation control circuit comprising a microcontroller integrated within the device to control access to the at least one integrated hardware testing hook and provide an interface to the software layer, the access being either local or remote, the interface to provide services associated with the at least one integrated hardware testing hook, the services comprising at least setting a trigger scenario to occur during operation of the device, gathering the test information when the trigger scenario occurs, storing the test information to a memory, and obfuscating details of accessing the at least one integrated hardware testing hook from the software layer.

2. The apparatus of claim 1, wherein the at least one integrated hardware testing hook captures voltages in the physical layer of the device by counting oscillations of a ring oscillator over short periods of time.

3. The apparatus of claim 1, wherein the services further comprise at least one of:
coordinating a trigger scenario, the trigger scenario comprising a microbreakpoint trigger event;
extracting a stored trace;
delivering validation information; and
providing different levels of access.

4. The apparatus of claim 1, wherein the validation control circuit is to provide at least one application programming interface (API) to receive a request from software.

5. The apparatus of claim 4, wherein the validation control circuit is to determine a security level access of the request.

6. The apparatus of claim 1, wherein obfuscating details of accessing the at least one integrated hardware testing hook from the software layer comprises storing information captured by the at least one integrated hardware testing hook in a region of memory obfuscated from view of an operating system.

7. An apparatus comprising:
a physical layer of a device comprising at least one integrated hardware testing hook to provide test information, the at least one integrated hardware testing hook to provide access to circuit traces regardless of a small form factor of the circuit and obviating use of a probe, the at least one integrated testing hook further to capture voltages in the physical layer of the device by counting oscillations of a ring oscillator over short periods of time and an on-die logic analyzer to collect trace information from the device; and
a validation control circuit to abstract the at least one integrated hardware testing hook from a software layer, control access to the physical layer, the access being either local or remote, provide an interface to a software layer, the interface to provide services associated with the at least one integrated hardware testing hook, the services comprising at least setting a trigger scenario to occur during normal operation of the device, gathering the test information when the trigger scenario occurs, and storing the test information to a memory, the validation control circuit further to conceal details of the at least one integrated hardware testing hook from the software layer.

8. The apparatus of claim 7, wherein the validation control circuit is to provide a plurality of access levels to the software layer.

9. The apparatus of claim 7, wherein the validation control circuit is further to store the test information in memory data structure having a predefined format.

10. A system comprising:
a processor;
a memory;
a physical layer of a device comprising at least one integrated hardware testing hook to provide test information, the at least one integrated hardware testing hook to provide access to circuit traces regardless of a small form factor of the circuit and obviating use of a probe, wherein the at least one integrated hardware testing hook captures voltages over time in the physical layer of the device by counting oscillations of a ring oscillator over short periods of time; and
a validation control circuit to abstract the at least one integrated hardware testing hook from a software layer, control access to the physical layer, the access being either local or remote, provide an interface to the software layer, the interface to provide services associated with the at least one integrated hardware testing hook, the services comprising at least setting a trigger scenario to occur during normal operation of the device, gathering the test information when the trigger scenario occurs, and storing the test information to a memory, the validation control circuit further to conceal details of the at least one integrated hardware testing hook from the software layer.

11. The system of claim 10, wherein the on-die logic analyzer is to monitor architectural registers of the processor.

12. The system of claim 10, wherein the on-die logic analyzer is to monitor a memory interface of the processor.

13. The system of claim 10, wherein the on-die logic analyzer is to monitor an input/output interface of the processor.

14. The system of claim 13, wherein the on-die logic analyzer is to validate conformance with a protocol by the processor.

15. The system of claim 10, wherein the on-die logic analyzer is to validate an electrical attribute of the processor.

16. The system of claim 10, wherein the on-die logic analyzer is to set a trigger event and to gather data upon occurrence of the trigger event.

17. The system of claim 16, wherein the on-die logic analyzer is further to set a state of the processor into a test scenario before setting the trigger event.

18. The apparatus of claim 1, wherein the trigger scenario comprises a complex combination of microarchitectural events.

19. The apparatus of claim 1, wherein the validation control circuit performs equivalent functionality as an external logic analyzer and obviates a need to use the external logic analyzer.

20. The apparatus of claim 1, wherein the validation control circuit is to be designed concurrently with the device and to reflect the latest features and capabilities of the device.

* * * * *